(12) United States Patent
 Kshirsagar et al.

(10) Patent No.: US 11,138,300 B2
(45) Date of Patent: Oct. 5, 2021

(54) MULTI-FACTOR PROFILE AND SECURITY FINGERPRINT ANALYSIS

(71) Applicant: T-Mobile USA, Inc., Bellevue, WA (US)

(72) Inventors: Vinay Kshirsagar, Sammamish, WA (US); Jeffrey M. Giard, Kirkland, WA (US); Michael J. Goo, Renton, WA (US); Xianglong Kong, Bellevue, WA (US); Tony A. Sandidge, Bellevue, WA (US); Seth H. Schuler, Bellevue, WA (US); Bala Subramanian, Sammamish, WA (US); Linda Zhao, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 164 days.

(21) Appl. No.: 15/789,571

(22) Filed: Oct. 20, 2017

(65) Prior Publication Data
US 2018/0039770 A1    Feb. 8, 2018

Related U.S. Application Data

(60) Division of application No. 13/612,755, filed on Sep. 12, 2012, now Pat. No. 9,824,199, which is a
(Continued)

(51) Int. Cl.
 *G06F 21/32* (2013.01)
 *G06F 21/31* (2013.01)
 *H04L 29/06* (2006.01)

(52) U.S. Cl.
 CPC .......... *G06F 21/32* (2013.01); *G06F 21/316* (2013.01); *H04L 63/0861* (2013.01)

(58) Field of Classification Search
 CPC ........ G06F 21/32; G06F 21/316; G06F 21/10; H04L 63/0861
(Continued)

(56) References Cited

U.S. PATENT DOCUMENTS 6,041,133 A    3/2000  Califano et al.
6,334,121 B1  12/2001  Primeaux et al.
(Continued)

FOREIGN PATENT DOCUMENTS

CN        1870025      11/2006
CN      101779180       7/2010
(Continued)

OTHER PUBLICATIONS

Office Action for U.S. Appl. No. 13/427,365, dated Apr. 18, 2018, Annamalai, "Service Enhancements Using Near Field Communication", 16 pages.
(Continued)

*Primary Examiner* — Vanel Frenel
(74) *Attorney, Agent, or Firm* — Lee & Hayes, P.C.

(57) ABSTRACT

A security fingerprint architecture is disclosed. A security fingerprint comprises one or more behavioral factors which store a history of events associated with one or more users. The data in the security fingerprint is exposed by one or more modes, each of which determines the conditions that data in the security fingerprint may be accessed. Security fingerprints support a number of primitive operations that allow set operations to be performed. Security fingerprints may be used in for authentication, advertising, and other operations either alone, or in conjunction with third party data sources. An exemplary platform of security fingerprints built upon a cellular infrastructure is also disclosed.

18 Claims, 11 Drawing Sheets

Related U.S. Application Data continuation-in-part of application No. 13/229,481, filed on Sep. 9, 2011, now abandoned.

(60) Provisional application No. 61/527,469, filed on Aug. 25, 2011.

(58) Field of Classification Search
USPC .................................. 705/6, 19, 21, 27, 2
See application file for complete search history.

(56) References Cited

U.S. PATENT DOCUMENTS

| | | |
|---|---|---|
| 6,516,288 B2 | 2/2003 | Bagne |
| 7,433,960 B1 | 10/2008 | Dube et al. |
| 7,689,418 B2 | 3/2010 | Ramaswamy et al. |
| 7,856,384 B1 | 12/2010 | Kulasooriya et al. |
| 7,908,644 B2 | 3/2011 | Roskind et al. |
| 8,316,086 B2 | 11/2012 | Ufford et al. |
| 8,364,587 B2 | 1/2013 | Nuzum et al. |
| 8,489,635 B1 | 7/2013 | Phoha et al. |
| 9,824,199 B2 | 11/2017 | Kshirsagar et al. |
| 10,168,413 B2 | 1/2019 | Annamalai et al. |
| 2001/0036273 A1 | 11/2001 | Yoshizawa |
| 2002/0116508 A1 | 8/2002 | Khan et al. |
| 2004/0162781 A1 | 8/2004 | Searl et al. |
| 2005/0169504 A1 | 8/2005 | Black |
| 2005/0228996 A1 | 10/2005 | Mayer |
| 2006/0053296 A1 | 3/2006 | Busboom et al. |
| 2006/0104484 A1 | 5/2006 | Bolle et al. |
| 2006/0194592 A1 | 8/2006 | Clough |
| 2006/0265495 A1 | 11/2006 | Butler et al. |
| 2006/0282660 A1 | 12/2006 | Varghese et al. |
| 2007/0025245 A1 | 2/2007 | Porras et al. |
| 2007/0179889 A1* | 8/2007 | Drummond ............ G07F 19/201 |
| | | 705/43 |
| 2007/0236330 A1 | 10/2007 | Cho et al. |
| 2007/0242827 A1 | 10/2007 | Prafullchandra et al. |
| 2007/0254712 A1 | 11/2007 | Chitti |
| 2007/0261116 A1 | 11/2007 | Prafullchandra et al. |
| 2007/0262134 A1 | 11/2007 | Humphrey et al. |
| 2007/0287471 A1 | 12/2007 | Wood |
| 2008/0045232 A1 | 2/2008 | Cone |
| 2008/0090595 A1 | 4/2008 | Liu et al. |
| 2008/0091453 A1 | 4/2008 | Meehan et al. |
| 2008/0091639 A1 | 4/2008 | Davis et al. |
| 2008/0098456 A1 | 4/2008 | Alward et al. |
| 2008/0130957 A1* | 6/2008 | Small .................. G16H 10/60 |
| | | 382/115 |
| 2008/0162397 A1 | 7/2008 | Zaltzman |
| 2008/0201212 A1 | 8/2008 | Hammad et al. |
| 2008/0209229 A1 | 8/2008 | Ramakrishnan et al. |
| 2008/0220777 A1 | 9/2008 | Kouadjo et al. |
| 2009/0036111 A1 | 2/2009 | Danford et al. |
| 2009/0049544 A1 | 2/2009 | Kashi |
| 2009/0075593 A1* | 3/2009 | Demirbasa ......... G08B 21/0277 |
| | | 455/41.2 |
| 2009/0077033 A1 | 3/2009 | McGary et al. |
| 2009/0089869 A1* | 4/2009 | Varghese ........... G06Q 20/4014 |
| | | 726/7 |
| 2009/0187492 A1* | 7/2009 | Hammad ............ G06Q 10/087 |
| | | 705/26.1 |
| 2009/0203367 A1 | 8/2009 | Pamminger et al. |
| 2009/0228370 A1 | 9/2009 | Shakkarwar |
| 2009/0233622 A1 | 9/2009 | Johnson |
| 2009/0249456 A1 | 10/2009 | Malas |
| 2009/0258637 A1 | 10/2009 | Liu et al. |
| 2009/0260075 A1 | 10/2009 | Gedge et al. |
| 2009/0282468 A1* | 11/2009 | Banga ............... H04L 29/12122 |
| | | 726/8 |
| 2009/0282473 A1* | 11/2009 | Karlson ................. G06F 21/62 |
| | | 726/17 |
| 2009/0299645 A1 | 12/2009 | Colby et al. |
| 2010/0057843 A1 | 3/2010 | Landsman et al. |
| 2010/0115610 A1* | 5/2010 | Tredoux ............... H04L 9/3231 |
| | | 726/19 |
| 2010/0122329 A1* | 5/2010 | Jakobsson ............ G06F 21/316 |
| | | 726/6 |
| 2010/0125505 A1 | 5/2010 | Puttaswamy |
| 2010/0130165 A1 | 5/2010 | Snyder et al. |
| 2010/0169262 A1* | 7/2010 | Kenedy ............... G06F 16/9535 |
| | | 706/50 |
| 2010/0274597 A1 | 10/2010 | Dill |
| 2010/0274815 A1 | 10/2010 | Vanasco |
| 2010/0291947 A1 | 11/2010 | Annamalai |
| 2010/0293094 A1 | 11/2010 | Kolkowitz et al. |
| 2010/0299292 A1 | 11/2010 | Collazo |
| 2010/0299376 A1 | 11/2010 | Batchu et al. |
| 2010/0305989 A1 | 12/2010 | Mu et al. |
| 2010/0306832 A1 | 12/2010 | Mu et al. |
| 2010/0325040 A1 | 12/2010 | Etchegoyen |
| 2010/0325711 A1 | 12/2010 | Etchegoyen |
| 2010/0332400 A1 | 12/2010 | Etchegoyen |
| 2011/0009092 A1 | 1/2011 | Etchegoyen |
| 2011/0016121 A1 | 1/2011 | Sambrani et al. |
| 2011/0021187 A1 | 1/2011 | Jayapalan et al. |
| 2011/0059751 A1 | 3/2011 | Zhang et al. |
| 2011/0077998 A1 | 3/2011 | Yan et al. |
| 2011/0093913 A1* | 4/2011 | Wohlert ............ H04W 12/0802 |
| | | 726/1 |
| 2011/0093920 A1 | 4/2011 | Etchegoyen |
| 2011/0106610 A1 | 5/2011 | Landis et al. |
| 2011/0130118 A1 | 6/2011 | Fan et al. |
| 2011/0154264 A1 | 6/2011 | Aravamudan et al. |
| 2011/0173071 A1 | 7/2011 | Meyer et al. |
| 2011/0178863 A1 | 7/2011 | Daigle |
| 2011/0191862 A1 | 8/2011 | Mandava et al. |
| 2011/0231223 A1 | 9/2011 | Winters |
| 2011/0231224 A1 | 9/2011 | Winters |
| 2011/0231225 A1 | 9/2011 | Winters |
| 2011/0231257 A1 | 9/2011 | Winters |
| 2011/0231258 A1 | 9/2011 | Winters |
| 2011/0231305 A1 | 9/2011 | Winters |
| 2011/0276689 A1 | 11/2011 | Rosen |
| 2011/0314558 A1 | 12/2011 | Song et al. |
| 2011/0321157 A1 | 12/2011 | Davis et al. |
| 2011/0321175 A1 | 12/2011 | Slater |
| 2012/0066065 A1 | 3/2012 | Switzer |
| 2012/0066611 A1 | 3/2012 | Aravamudan et al. |
| 2012/0072546 A1 | 3/2012 | Etchegoyen |
| 2012/0078894 A1* | 3/2012 | Jiang ................. G06K 9/00758 |
| | | 707/723 |
| 2012/0079576 A1 | 3/2012 | Han et al. |
| 2012/0079588 A1 | 3/2012 | Aaron |
| 2012/0084203 A1 | 4/2012 | Mehew et al. |
| 2012/0094597 A1* | 4/2012 | Tysowski ............... G06Q 10/10 |
| | | 455/41.1 |
| 2012/0131034 A1 | 5/2012 | Kenedy et al. |
| 2012/0131657 A1 | 5/2012 | Sunstein et al. |
| 2012/0137340 A1 | 5/2012 | Jakobsson et al. |
| 2012/0159564 A1 | 6/2012 | Spektor et al. |
| 2012/0180107 A1 | 7/2012 | Gammill et al. |
| 2012/0200389 A1 | 8/2012 | Solomon |
| 2012/0204033 A1 | 8/2012 | Etchegoyen et al. |
| 2012/0210388 A1 | 8/2012 | Kolishchak |
| 2012/0226701 A1 | 9/2012 | Singh |
| 2012/0311684 A1* | 12/2012 | Paulsen .................. G06F 21/44 |
| | | 726/6 |
| 2013/0097673 A1 | 4/2013 | Meehan et al. |
| 2013/0133054 A1 | 5/2013 | Davis et al. |
| 2013/0159021 A1* | 6/2013 | Felsher .................. G16H 10/60 |
| | | 705/3 |
| 2013/0159413 A1 | 6/2013 | Davis et al. |
| 2013/0167207 A1 | 6/2013 | Davis et al. |
| 2013/0201000 A1 | 8/2013 | Solomon |
| 2015/0242399 A1 | 8/2015 | Ramanathan et al. |

(56) References Cited

U.S. PATENT DOCUMENTS

| | | | | |
|---|---|---|---|---|
| 2015/0347734 A1* | 12/2015 | Beigi | ...... | H04L 9/3231 713/155 |
| 2019/0137594 A1 | 5/2019 | Annamalai et al. | | |

FOREIGN PATENT DOCUMENTS

| | | |
|---|---|---|
| CN | 102622718 | 8/2012 |
| JP | 2002288070 A | 10/2002 |
| JP | 2005038020 | 2/2005 |
| JP | 2010277356 | 12/2010 |
| JP | 201139674 | 2/2011 |
| WO | WO2005106523 | 11/2005 |
| WO | WO2010148860 | 12/2010 |
| WO | WO2011008848 | 1/2011 |
| WO | WO2013028794 | 2/2013 |

OTHER PUBLICATIONS

Japanese Office Action dated Apr. 18, 2018 for Japanse patent application No. 201380047486.8, a counterpart foreign application of U.S. Pat. No. 9,824,199.

Office Action for U.S. Appl. No. 13/427,365, dated Dec. 12, 2017, Annamalai, "Service Enhancements Using Near Field Communication", 18 pages.

Chinese Office Action dated Nov. 27, 2018 for Chinese Patent Application No. 201380047486.8, a counterpart of U.S. Pat. No. 9,824,199, 4 pages.

Chinese Office Action dated Apr. 18, 2018 for Chinese Patent Application No. 201380047486.8, a counterpart foreign application of U.S. Pat. No. 9,824,199.

European Office Action, dated Sep. 11, 2018, for European Application No. 13837114.1, a counterpart foreign application of U.S. Pat. No. 9,824,199, 4 pages.

A collection of press releases re: Mobilelron, Inc retrieved from < http://www.dowjones.com/factiva/?from=factivaHome&link= > on Nov. 15, 2011, 84 pages.

Buthpitiya et al., "n-gram Geo-Trace Modeling", In the Proceedings of the Ninth International Conference on Pervasive Computing, San Francisco, CA, Jun. 12-15, 2011. 18 pages.

Translated Chinese Office Action dated Feb. 13, 2017 for Chinese Patent Application No. 201280024686.7, a counterpart foreign application of U.S. Appl. No. 13/427,365, 7 pages.

Translated Chinese Office Action dated Mar. 9, 2017 for Chinese Patent Application No. 201280050746.2, a counterpart foreign application of U.S. Appl. No. 13/229,481, 8 pages.

Chinese Office Action dated Jun. 7, 2016 for Chinese patent application No. 201280050746.2, a counterpart foreign application of U.S. Appl. No. 13/229,481.

Chinese Office Action dated Jun. 7, 2016 for Chinese patent application No. 201280024686.7, a counterpart foreign application of U.S. Appl. No. 13/427,365.

Chinese Office Action dated Aug. 3, 2017 for Chinese patent application No. 201380047486.8, a counterpart foreign application of U.S. Appl. No. 13/612,755, 27 pgs.

Extended European Search Report dated Jan. 30, 2015 for European Patent Application No. 12826129.4, 7 pages.

Partial Supplementary European Search Report dated Mar. 30, 2016 for European Patent Application No. 13837114.1, 8 pages.

Extended European Search Report dated Mar. 4, 2014 for European patent application No. 12764304.7, 7 pages.

Extended European Search Report dated Jul. 21, 2016 for European patent application No. 13837114.1, 16 pages.

Final Office Action for U.S. Appl. No. 13/612,755, dated Nov. 7, 2013, Vinay Kshirsagar, "Multi-Factor Profile and Security Fingerprint Analysis", 15 pages.

Non-Final Office Action for U.S. Appl. No. 13/229,481, dated Jan. 16, 2013, Jeffrey M. Giard et al., "Multi-Factor Identity Fingerprinting with User Behavior", 8 pages.

Office Action for U.S. Appl. No. 13/229,481, dated Oct. 23, 2014, Jeffrey M. Giard, "Multi-Factor Identity Fingerprinting with User Behavior", 22 pages.

Office Action for U.S. Appl. No. 13/612,755, dated Nov. 4, 2014, Vinay Kshirsagar, "Multi-Factor Profile and Security Fingerprint Analysis", 18 pages.

Office Action for U.S. Appl. No. 13/229,481, dated Feb. 24, 2015, Jeffrey M. Giard, "Multi-Factor Identity Fingerprinting with User Behavior", 22 pages.

Final Office Action for U.S. Appl. No. 13/612,755, dated Mar. 24, 2015, Vinay Kshirsagar, "Multi-Factor Profile and Security Fingerprint Analysis", 19 pages.

Office action for U.S. Appl. No. 13/427,365, dated Mar. 28, 2017, Annamalai et al., "Service Enhancements Using Near Field Communication", 15 pages.

Office action for U.S. Appl. No. 13/427,365, dated Apr. 14, 2016, Annamalai et al., "Service Enhancements Using Near Field Communication", 19 pages.

Office Action for U.S. Appl. No. 13/612,755, dated Apr. 5, 2017, Vinay Kshiragar et al., "Multi-Factor Profile and Security Fingerprint Analysis", 8 pages.

Office Action for U.S. Appl. No. 13/427,365, dated Jun. 1, 2015, Magesh Annamalai, "Service Enhancements Using Near Field Communication", 14 pages.

Non-Final Office Action for U.S. Appl. No. 13/612,755, dated Jun. 28, 2013, Vinay Kshiragar et al., "Multi-Factor Profile and Security Fingerprint Analysis", 8 pages.

Office action for U.S. Appl. No. 13/229,481, dated Jun. 6, 2016, Giard et al., "Multi-Factor Identity Fingerprinting with User Behavior", 17 pages.

Office Action for U.S. Appl. No. 13/427,365, dated Jul. 17, 2017, Annamalai et al., "Service Enhancements Using Near Field Communication", 19 pages.

Office Action for U.S. Appl. No. 13/229,481, dated Jul. 19, 2013, Giard et al., "Multi-Factor Identity Fingerprinting with User Behavior", 23 pages.

Office action for U.S. Appl. No. 13/427,365, dated Jul. 6, 2016, Annamalai et al., "Service Enhancements Using Near Field Communication", 17 pages.

Final Office Action for U.S. Appl. No. 13/612,755, dated Sep. 14, 2016, Kshirsagar et al., "Multi-Factor Profile and Security Fingerprint Analysis", 16 pages.

Office action for U.S. Appl. No. 13/427,365, dated Sep. 21, 2015, Inventor #1, "Service Enhancements Using Near Field Communication", 18 pages.

PCT Search Report and Written Opinion dated Dec. 17, 2013 for PCT application No. PCT/US13/59479, 14 pages.

PCT Search Report and Written Opinion dated Mar. 13, 2013 for PCT Application No. PCT/US12/51927, 10 pages.

PCT Search Report dated Aug. 29, 2012 for PCT application No. PCT/US12/30353, 9 pages.

Shi et al., "Implicit authentication through learning user behavior", 13th Information Security Conference (ISC 2010), Oct. 25-28, 2010, Boca Raton, FL., 16 pages.

Office Action for U.S. Appl. No. 16/236,921, dated Aug. 12, 2019, Annamalai, "Service Enhancements Using Near Field Communication", 16 pages.

Office Action for U.S. Appl. No. 16/236,921, dated Apr. 17, 2020, Annamalai, "Service Enhancements Using Near Field Communication", 18 Pages.

European Office Action dated Feb. 14, 2020 for European Patent Application No. 13837114.1, a counterpart foreign application of the U.S. Pat. No. 9,824,199, 5 pages.

Office Action for U.S. Appl. No. 16/236,921, dated Dec. 20, 2019, Annamalai, "Service Enhancements Using Near Field Communication", 18 pages.

Office Action for U.S. Appl. No. 16/236,921, dated Jul. 16, 2020, Annamalai, "Service Enhancements Using Near Field Communication", 17 Pages.

* cited by examiner

900

1000

MULTI-FACTOR PROFILE AND SECURITY FINGERPRINT ANALYSIS

CROSS REFERENCE TO RELATED PATENT APPLICATIONS

This is a divisional application which claims priority to commonly assigned, co-pending U.S. patent application Ser. No. 13/612,755, filed Sep. 12, 2012, which is a Continuation in Part of U.S. patent application Ser. No. 13/229,481, filed Sep. 9, 2011. U.S. patent application Ser. No. 13/229,481 claims priority to U.S. Provisional Application No. 61/527,469, filed Aug. 25, 2011. Application Ser. Nos. 13/612,755, 13/229,481 and 61/527,469 are fully incorporated herein by reference.

BACKGROUND

Today's users have daily interaction with a plethora of information systems. One example is where users interact with personal information systems such as their personal social network accounts. Another example is where users interact with commercial information systems, such as a store's point of sale system by making a purchase, or with a cellular provider's billing system by placing a mobile call. Yet another example is where users interact with government information systems, such as in maintaining Social Security and tax records.

In many cases, the user greatly depends on the data in those information systems. When a user pays for an item, either online via an electronic marketplace, or offline in a bricks and mortar store in a point of sale system, the transaction should ensure that the credit/debit card used for payment corresponds to the user. Similarly, when a user registers with a government site and enters personal information the transaction should also should ensure that the identity of the person is authenticated. Specifically, authentication is the performing of tests to guarantee within a known degree of confidence that a user corresponds to a user identity when interacting with an information system.

Presently, authentication is performed by several common methods. Authentication is typically performed by verifying a user's indicia for that user's identity. The user's indicia are called credentials. A user's credentials may come in the form of a user proffering a known value, such as a password or personal identification number ("PIN"). A user's credentials may come in the form by a user proffering a token such as a proximity card, or a fingerprint or retina scan.

In general, authentication presently relies on credentials in the form of a user possessing a known value, or of a user physically holding a token. However identity theft can occur when known values based on memorization are hacked, or tokens are stolen or otherwise misappropriated. Furthermore, many information systems only authenticate users upon logging onto a system, and subsequently limit system requests to verify identity as not to constantly interrupt the user. Accordingly, there is an opportunity to improve security and prevent identity theft via identifying additional means of authentication.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

DETAILED DESCRIPTION

Introduction

Figure 1:
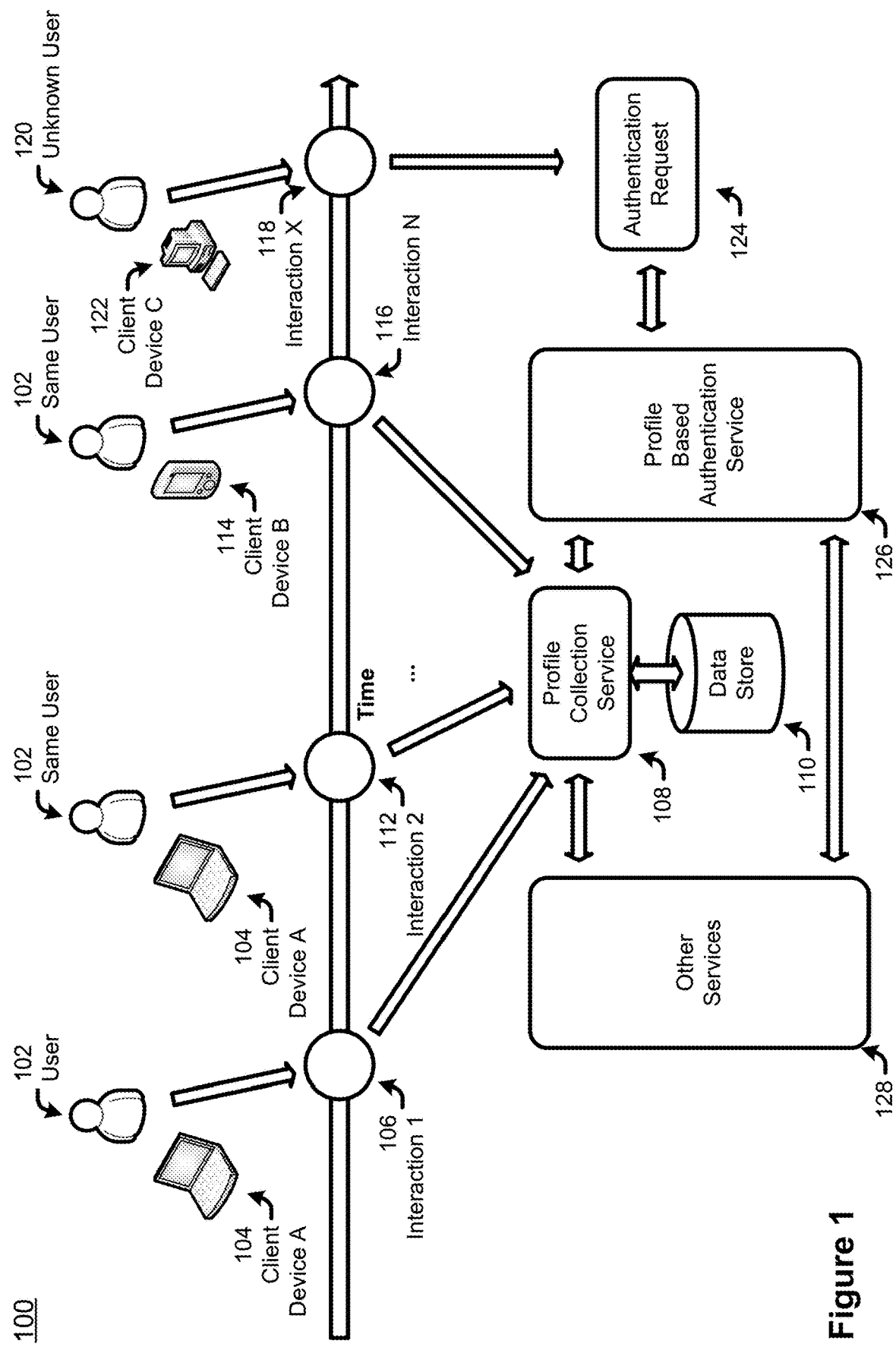
FIG. 1 is a top level diagram illustrating an example multi-factor identity fingerprinting service collecting data relating to user historical activity for access via an example profile based authentication service.

This disclosure describes multi-factor identity fingerprinting with user behavior. There is presently a high frequency of user interaction with a diversity of information systems. Accordingly, each user has a critical mass of interactions that may be tracked whose factors may be associated with a user's identity. Specifically, multiple factors relating to user behavior are stored in a data structure called a profile and aggregated in the profile as a history of the user's behavior. The data structure may be persisted in a computer readable memory. At least some subset of the user's interactions stored in the profile may be used to generate an identity fingerprint that subsequently constitute a user's credentials.

A factor can be any pattern of observable values relating to a user interaction. These factors may then be used as input in generating an identity fingerprint. Example observable values may include tracking when a user accesses one of their social networking pages, tracking the web address of the page, tracking the time the page was accessed, or tracking particular action performed such as posting a new picture or entering a comment. When these observables are stored in a user profile, they are called historical activities. In particular, whenever an information system receives an event notification, that event notification may be stored as a historical activity in the user's profile. In general, these values are stored in a profile and used to determine factors such as usage patterns with one or more applications and/or one or more client devices, as well as the associated user preferences.

Usage patterns with applications and/or a client device are a factor that relates to tracking what data is accessed, and what application or client device features are typically availed to by a user. An example of a usage pattern is determining that www.mysocialnet.com is the most commonly accessed web site via a web browser called CoolBrowser.exe. However, usage patterns are but one consideration in generating a multi-factor identity fingerprint.

User behavior may be another factor. User behavior relates to correlations of usage patterns with other input other that the application or client device itself. An example might be determining a user typically accesses www.mysocialnet.com around 11:30 AM every day, indicating that the user is updating their social network records during lunch breaks. Another example might be the user typically accessing www.fredspizza.com on rainy Sundays, indicating that the user does not typically go out for food when raining.

User preferences may be yet another factor. Applications and client devices typically have user setting indicating user preferences in using those applications and client devices respectively.

Usage patterns, user behavior and user preferences are only some factors that may be applied to multi-factor identity fingerprinting. The above factors are exemplary and not intended to be limiting. Essentially, a factor can be based on any values that may be detected and stored, and subsequently may be a potential factor used in multi-factor identity fingerprinting. Factors themselves may be either stored with the profile, or otherwise dynamically derived.

In multi-factor identity fingerprinting, at least a subset of a user's profile stored online becomes bound to that user. In some embodiments, the user's identity may be used as that user's credentials. In this way, the information system may authenticate or verify a user's identity at any time. The information system may have authentication capabilities able to access the user identity finger print or to query the user profile, built in-system itself, or alternatively may delegate those functions to a separate system.

In another embodiment, security attacks may be catalogued and aggregated. Since an information system does not rely on a password or a physical token, the information system may compare any event or notification during the user's session, compare it with the user's identity fingerprint, and determine whether the user's behavior is consistent with the identity fingerprint or alternatively consistent with a query against the user's profile. Since the identity fingerprint is readily accessible, there is no need to interrupt the user's session with requests for passwords or other tokens. Thus a larger set of security checks may be monitored. This information may be analyzed to identify patterns of security attacks/threat monitoring or for identity management.

In yet another embodiment, identity fingerprints may be used to discover categories of usage among users. Since the identity fingerprint provides a snapshot of a user's history, the identity fingerprint is very difficult to diverge from a user's actual or likely behavior. Accordingly, high confidence can be ascribed in comparing and aggregating different identity fingerprints. Identified categories may subsequently be used to direct advertising or to obtain business intelligence.

Overview

FIG. 1 illustrates one possible embodiment of multi-factor identity fingerprinting 100. Specifically, it illustrates how a user 102 progresses over time and develops a historical profile and an identity fingerprint that may be used subsequently for authentication.

User 102 may have client device A 104 and use it to make an interaction 106 with an information system. Interaction 106 could possibly be user 102 using client device A 104 to access a web site called www.awebstore.com. User 102 may make some purchases during interaction 106.

Observable values collected during interaction 106 and subsequent interactions may be stored as historical activity records in a user profile via profile collection service 108. Specifically, the set of records of user 102's historical activities is user 102's profile. The information collected during interaction 106 and subsequent interactions are converted into one or more records of user 102's historical activities. After conversion, profile collection service 108 stores records of user 102's historical activities with user 102's profile in a data store 110.

As user 102 progresses over time, historical activity records of subsequent interactions are also collected in the user's profile. As shown via interaction 112, user 102 may later interact with a different information system using user client device A 104. For example, interaction 112 may be user 102 using user client device A 104 to update the user's social network records at www.mysocialnet.com. Again, user 102's historical activities during interaction 112's are captured by the profile collection service 108 and stored in data store 110.

Accordingly, a user 102's profile need not be specific to a particular site or to a particular type of interaction. Any definable and observable user event whose parameters may be captured is a candidate for storing as one or more historical activity records for user 102's profile. Collecting event information and collecting parameters to create historical activity records is described in further detail with respect to FIG. 3.

User 102's profile need not be specific to a particular client device. As shown via interaction 116, which may be after a number of other interactions, user 102 may use a different client device, here client device B 114 to interact with an information system. Interaction 116 could potentially be user 102 further updating user 102's social network records at www.mysocialnet.com, perhaps to upload a picture just taken with client device B 104. Again, profile collection service 108 converts interaction 116 into one or more historical records associated with user 102's activities and stores those records as part of user 102's profile in data store 110.

When the profile collection service 108 has stored a statistically significant amount of user historical records for a user's profile in data store 110, the user's profile may then be used to generate an identity fingerprint. As shown in interaction 118, an unknown user 120 using client device C 122 may attempt to edit user 102's social network records at www.mysocialnet.com. In fact unknown user 120 may be in possession of user 102's password and thereby log into user 102's account on www.mysocialnet.com.

During interaction 118, unknown user 120 may attempt to make a post to user 102's social network records at www.mysocialnet.com. The posting attempt may trigger an event trapped by www.mysocialnet.com, which in turn may make an authentication request 124 via profile based authentication service 126. The profile based authentication service 126 may then convert the posting attempt into user activity indicia that is comparable to user 102's profile. After conversion, profile based authentication service 126 may query data store 110 via profile collection service 108 for some subset of user 102's historical activity records. For example, authentication request 124 may limit retrieved records only to www.mysocialnet.com activity by user 102 over the past three years.

Profile based authentication service 126 may generate a summary file of the retrieved records into an identity fingerprint for the user. The identity fingerprint comprises a summary of the user's history and may take many potential forms. In one embodiment, the identity fingerprint may identify several different activities, and store the frequency the user performs those activities. In another embodiment, the identity fingerprint may store other users that the user's account may send information to. The identity fingerprint may be cached, such that in lieu of the profile based authentication service 126 generating the identity fingerprint dynamically, it may be served directly.

Profile based authentication service 126 may then correlate unknown user 120's activity against the identity fingerprint. For example, if unknown user 120's post is filled with words on a profanity list, and user 102 has never used profanity in www.mysocialnet.com postings, the profile based authentication service 126 may report a low correlation with respect to the identity fingerprint. If the correlation is sufficiently low, the profile based authentication service 126 may send an error message indicating that authentication failed. Alternatively, if the correlation is sufficiently high, the profile based authentication service 126 may send an authentication message indicating successful authentication. If there is insufficient information to provide a statistically significant conclusion, the profile based authentication service 126 may simply send a message indicating no conclusion. In this way, the profile based authentication service 126 may lower false positives during authentication.

In the preceding authentication discussion, note that unknown user 120 did not have to use the same client device as previously used by user 102. Rather than having physical possession of credentials, authenticating unknown user 120 was based on the user's profile, specifically as an identity fingerprint used as a credential and readily retrievable from data store 110. Furthermore, note that authentication using the identity fingerprint may operate independently or alternatively in conjunction with the www.mysocialnet.com's login authentication. Even though unknown user 120 had user 102's password credentials, those credentials were independently verified against the user's identity fingerprint credential via the profile based authentication service 126. Moreover, this authentication process was transparent to unknown user 120. In addition, the unknown user 120 cannot obtain the information from the user 102, since the behavioral aspects of user 102 is cannot be obtained through recollection and/or coercion. Accordingly, because of a lack of access to the profile based authentication process, unknown user 120 may have been able to hack or spoof www.mysocialnet.com's login, but unknown user 120 was not able to spoof the profile based authentication process as it uses historical behavioral attributes. Unknown user 120 simply could not have changed the user 102's history over the past three years of never posting profanity. In this way, profile based authentication provides a more secure authentication, and provides continuous authentication separate from login's and other means where a user must explicitly enter credentials.

How an information system, such as www.mysocialnet.com handles failed authentications may be left up to the information system itself, or may be based on how the profile based authentication service 126 is configured. For example for financial transactions or for transactions relating to sensitive personal information, the profile based authentication service 126 may be configured to simply block unknown user 120 from interacting with the information system. For less sensitive scenarios, the profile based authentication service 126 may be configured to require the unknown user 120 to proffer alternative credentials. For even less sensitive scenarios, the profile based authentication service 126 may be configured to simply send a notification in the form of electronic mail, text message, or other messaging services to user 102 that an unusual event occurred.

The profile based authentication service 126 may be configured to have multiple of correlation models. Each correlation model is a statistical model which specifies how to calculate a similarity score of the user event and historical event data in the user profile and/or the user identity fingerprint. The correlation model may be very simple where the presence of certain terms is sufficient to return a result of zero correlation. Alternatively, the correlation model may be very complex and may comprise learning algorithms with a varying degree of confidence. The profile authentication service 126 may combine different correlation models to derive additional confidence in authentication results. Confidence models are discussed in further detail with respect to FIG. 3.

In this way, profile based authentication may be configured to meet the different authentication needs for different information systems. The profile based authentication service 126 may expose an application programming interface ("API") to be programmatically accessible to an arbitrary information system. For example, the profile based authentication service 126 may be used in conjunction with credit card companies to provide additional indicia as to the identity of an arbitrary user. In this way, the user need not be in possession of a client device. In fact the client device itself may be subject to authentication. For example, if a client device is used to make a long distance phone call to a remote location that the user never has accessed, the cellular service may make an authentication request 124 against the profile based authentication service 126 and may require the user provide additional credentials. The profile based authentication services can be configured to provide just the identity a specific verification answer, such as yes/no/inconclusive, thereby protecting the subscriber's privacy.

Since the profile based authentication service 126 is able to serve pre-calculated/pre-made user identity fingerprints, the profile based authentication service 126 may be used for non-authentication applications. For example, the profile based authentication service 126 may be queried by other services 128 for user identity fingerprints for analysis, and categories of user behavior may thereby be identified. These categories in conjunction with the histories of user behavior may be used for directed advertising or to generate general business intelligence.

If a service 128 desires to have access to more extensive data beyond the identity fingerprints, the service 128 can access the profile collection service 108 directly, which has a critical mass of user historical activities stored in data store 110. The services 128, such as business intelligence or advertising targeting services may access the user historical activity records in data store 110 via profile collection service 108 to perform queries unrelated to authentication. Other services 128 may include business intelligence and advertising applications as discussed above. However, they may also include servicing law enforcement data subpoenas, identity management, and threat management request.

With the wide range of information systems that may utilize identity fingerprints and user behavior profiles, the profile collection service 108 and profile based authentication service 126 may incorporate a billing system to monetize authentication and data requests. The billing system may be a separate module, or alternatively incorporated into both the profile collection service 108 and profile based authentication service 126. For example, the profile collection service 108 and profile based authentication service 126 may store records of each data and authentication request in data store 110 or other data store, which may then be queried to generate a bill. Alternatively, the profile collection service 108 and profile based authentication service 126 may store request counts by particular parties, and may generate a bill per alternative billing arrangements such as flat fees or service subscription models.

Exemplary Hardware Environment for Multi-Factor Identity Fingerprinting

Figure 2:
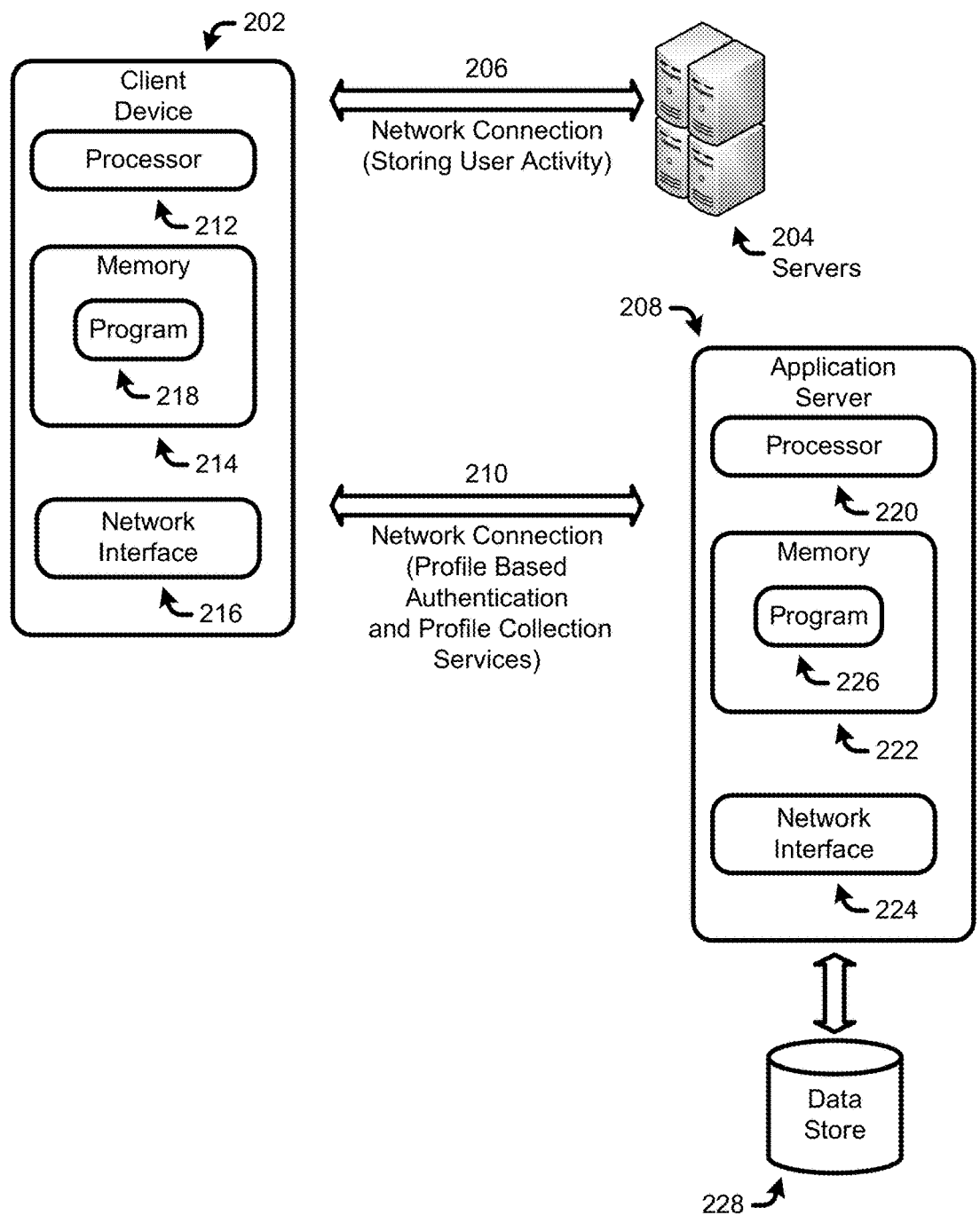
FIG. 2 is an example hardware platform for multi-factor identity fingerprinting.

FIG. 2 illustrates one possible embodiment of a hardware environment 200 for multi-factor identity fingerprinting. Specifically FIG. 2 illustrates a client device 202 configured collect user historical activity data either on the client device 202 itself or alternatively hosted on servers 204 and accessed via network connection 206. Examples of historical activity data collected on the client device 202 itself include trapping keystrokes, accessing local data such as photos, or monitoring local application usage such as entering web addresses into internet browsers.

FIG. 2 also illustrates the client device 202 configured to connect to the profile collection service 108 and/or profile based authentication service 126 as hosted on application server 208 via network connection 210.

Network connection 206 relates to client device 202 accessing information systems as part of user activity and network connection 210 relates to accessing the profile collection system 108 and/or profile based authentication system 126. Notwithstanding these different applications, both network connection 206 and network connection 210 may be any method or system to connect to remote computing device. This may be in the form of both wired and wireless communications. For example, the client device 202 may be personal computer on a wired Ethernet local area network or a wired point of sale system in a store. Alternatively, the network connections 206 and/or 210 may be wireless connections either via Wi-Fi for packet data or via cellular phone protocols which may include CDMA 2000, WCDMA, HSPA, LTE or successor cellular protocols. Accordingly, the preceding specification of network connections 206 and 210 is not intended to be limited by selection of network protocol.

In alternative embodiments, client device 202 might store user historical activity data or authentication requests locally. Interfacing with information system servers 204 or with profile based authentication application server 208 need not be via network collection. For example, locally stored user historical activity data or authentication requests may be stored on a portable memory stick and then used to manually access information servers 204 or profiled based authentication application server 208.

Client device 202 is any computing device with a processor 212 and a memory 214. Client device 202 may optionally include a network interface 216. Client device 202 may be a cellular phone including a smart phone, a netbook, a laptop computer, a personal computer, or a dedicated computing terminal such as a point of sale system terminal. Client device 202 would also include distributed systems such as a terminal accessing a centralized server as with web top computing.

Client device 202's memory 214 is any computer-readable media which may store include several programs 218 and alternatively non-executable data such as documents and pictures. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

Programs 218 comprise computer-readable instructions including operating system and other system functionality as well as user applications. The operating system may support the ability to trap application events. Trapping application events enables a program to capture observable data that may subsequently stored as a user historical activity record. Examples include, but are not limited to journaling hooks and trampoline functions. In general, a trapped application event may be associated with a programmatic handler which in turn stores input and/or output parameter data associated with the operation of the event. In this way, an arbitrary user event and interaction with application, may be monitored, associated data stored, and then processed for conversion into one or more user historical activity records.

User applications may include applications designed for local use such as word processors or spreadsheets. Local applications may include utilities such as programs to monitor local usage. Applications in this class may include, but are not limited to keystroke monitors and near field communication monitors. Alternatively, user applications may include applications such as web browsers or cloud clients designed to interact with a remote systems.

Application server 208 is any computing device capable of hosting profile collection system 108 and/or profile based authentication server 126. Application server 208 comprises processor 220, memory 222 and network interface 224. As per the preceding discussion regarding client 202, memory 222 is any computer-readable media including both computer storage media and communication media.

In particular, memory 222 store programs 226 which may include an operating system and computer-readable instructions for profile collection system 108 and/or profile based authentication server 126.

Memory 222 may also store programs 226 that may include a database management system if data store 228 is configured as a database. Data store 228 may be configured as a relational database, an object-oriented database, a columnar database, or any configuration supporting queries of user profiles and user historical activity data.

Exemplary Operation of Multi-Factor Identity Fingerprinting

Figure 3:
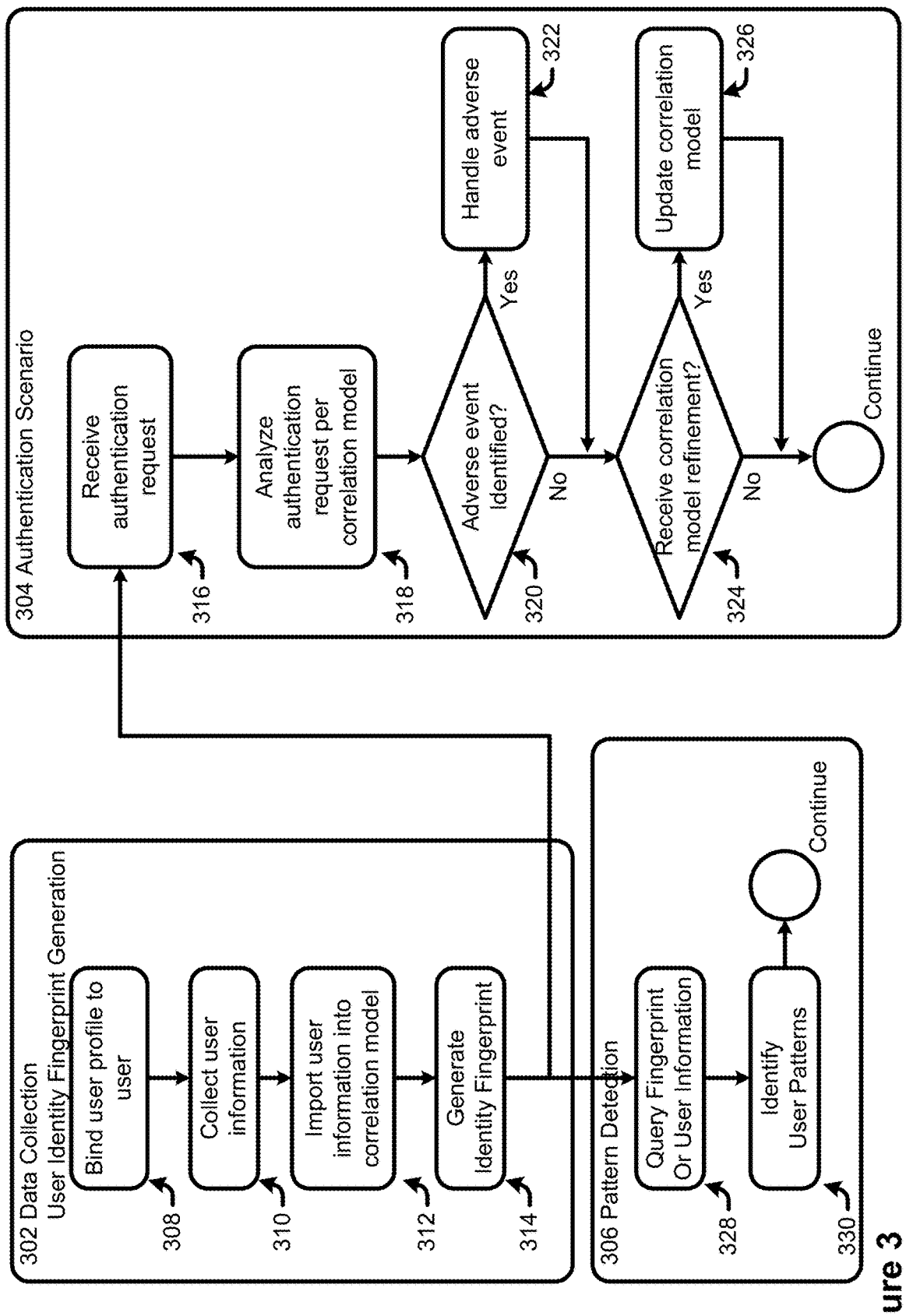
FIG. 3 is a flow chart of an example process for multi-factor identity fingerprinting.

FIG. 3 illustrates one possible embodiment of a multi-factor identity fingerprinting process 300. There are at least three different actors for multi-factor identity fingerprinting process 300, including: (1) the profile based authentication system, (2) a user being tracked and authenticated by the profile based authentication system and (3) a vendor or information system seeking to use the multi-factor identity fingerprinting system. Different actors will perceive different subsets of multi-factor identity fingerprinting process 300. In particular, the vendor or information system's perspective will vary depending on the application. Some systems will simply use the multi-factor identity fingerprinting system for authentication. Others will use the system to aggregate users and to identity usage patterns by a set of users.

The multi-factor identity fingerprinting process 300 as a whole may be subdivided into the following broad sub-processes:

1. Data Collection/User Identity Fingerprint Generation 302,
2. Authentication 304, and
3. Pattern Detection 306.

In block 308, a user profile is bound to a particular user. The user profile will contain the user's historical activity records, and will be used as to generate the user's identity fingerprint. Since the user's identity fingerprint will be used the user's credentials and accordingly, the binding must be accurate. The user profile need not be bound to a particular client device. However, the user profile may contain a record that the user always uses particular client devices.

Binding may be either static or dynamic. With static binding, a user may affirmatively create a user profile record with the profile based authentication system. In the record, the user may indicate client devices or applications typically accessed. From this information, the multi-factor identity fingerprinting system may more easily determine whether an incoming user historical activity record relates to a particular user profile. However, binding need not be static. Since the profile based authentication system's client devices may track indicia of user identity such as user logon information, the multi-factor identity fingerprinting system may aggregate records from similar logons independent of any static input from a user.

One advantage of dynamically binding user historical activity records to a particular user is to distinguish different users who happen to use the same user accounts. For example, a single family account may be used by the owner of the account, the owner's spouse and the owner's child. In this case, the profile based authentication system may correctly generate three profiles (and subsequently user identity fingerprints corresponding to each of the three profiles) rather than just one. Thus the multi-factor identity fingerprinting system not only is not tied to a client device, it is also not tied to a particular user login or account for an information system.

In block 310 the client device or information system the client device is interacting with collects user information. In one embodiment, a client device or information system enlists in a correlation model. The correlation model may specify particular user events, and for each user event may further specify data to be captured. The user event typically is an interaction with an application that may be captured by an operating systems eventing or notifications system. For example, if a user clicks on a button, the operating system may capture the button click, and as user information may capture the active application, the button identity along with the user identity. Furthermore, client device or information system may have an event handler that performs additional information lookup not specific to the captured event. For example, in addition to capturing the button click, the event handler may run a program to capture what other applications were open, or if there were any active network sessions.

Accordingly, the client device may capture a very wide range of user information. It is precisely because it is possible to capture a wide range of possible user information that user information captured may be limited to events specified by a correlation model and the specific data used by the correlation model for each event.

In block 312, user information is imported into the associated correlation model. In contrast to block 310 where the client device or information system is capturing raw user information, in block 312, the user information is converted into user historical activity records. Specifically, the user information is parsed, and then mapped to a format that may be imported by the profile collection service 108 into the data store 110, for subsequent retrieval by the profile based authentication service 126 or other services 128. For example, the raw data for a button click in an application called MyApp may come in the form of ("OKButton", UserBob, 12:12:00 PM, MyApp). This raw data may be converted into the following record (Profile 111, MyApp: OKButton) through the following transformations:

(1) The account name UserBob may be mapped to a user profile with an identifier of Profile 111.
(2) The correlation model may have a format where the application and user interface element are concatenated together into a single field. In this example, OKButton and MyApp are converted to MyApp:OKButton.
(3) Some data may be eliminated as not relevant to a particular correlation model. In this example, the 12:12: 00 PM time was simply dropped.

Any number of transformations data actions may be performed against the raw user information prior to conversion into a user historical activity record. Third party data may be accessed for inclusion in the user historical activity record. For example, credit card identification or phone number identification information may be looked up and included in the user historical activity record. Additionally, data validation may be performed. For example, prior to loading a record via the profile collection service 108 into the data store 110, the client can perform record format validation and value validation checks.

Alternatively, event user information trapped need not be specific to a particular correlation model. In order for multiple correlation models to access the same data, there may be a universal user historical activity record specified. In this embodiment, a client device or information system may enlist in events rather than correlation models.

The user information converted into user historical activity records may be loaded into data store 110. Data store 110 may have a single database or multiple databases. Notwithstanding the number of databases used, data from multiple users from multiple client devices for multiple events may all be stored in data store 110.

In block 314, the multi-factor identity fingerprinting system generates a user identity fingerprint. The user identity fingerprint may be generated on demand or alternatively be proactively refreshed in a background process. At least a subset user historical records stored in a user's profile are used as the raw data to generate a user identity fingerprint. The user identity fingerprint is a summary of the user's history. The user identity fingerprint may be as simple as generating a single number used as a straightforward numerical score such as generating a credit rating or a grade for a class. In the alternative, the user identity fingerprint may provide a parcel of data summarizing relevant user activity. For example, if a requesting system is interested in the creditworthiness of a user, the fingerprint might report the number of bounced checks, the number of credit card rejections, and the number of returns a user performed at a store. Data in the identity fingerprint need not be numerical. By way of another example, if a requesting system is interested as to whether a user typically engages in profanity on a website, the identity fingerprint may simply store a Boolean value. Data in the identity fingerprint need not be limited to data collected by a single system, but may be combined with external data. By way of yet another example, an identity fingerprint may combine a number of bounced checks with a record of times a user was arrested for credit card fraud.

User profiles and user identity fingerprints may be used in any number of ways. Two potential embodiments are authentication of which one example is shown in 304 and pattern detection of which one example is shown in 306.

Authentication scenario 304 is from the perspective of the multi-factor identity fingerprinting system servicing a vendor's information system request to authenticate a user. In block 316, an information system will trap an event that the information system is programmed to perform a profile based authentication request. In one embodiment, the information system, will trap the event and associated user data, convert the data into one or more user historical activity record as described with respect to block 312. These user historical activity records will be used as indicia of user activity and submitted as part of an authentication request 124 to the profile based authentication service 126.

Indicia of user activity may include a broad range of potential values. Table 1 enumerates some potential indicia values:

TABLE 1

Exemplary User Indicia

| Indicia | Example |
| --- | --- |
| Location | Global Positioning Satellite Coordinates |
| Calling Pattern | Whether a call was made to a commonly contacted individual or not |
| Near Field Communications Activity | The cost of a purchase made using near field communication capabilities |
| Internet Activity | The web address accessed during an internet session |
| Short Message Service | The contents of a text message |
| Social Network | The contents of updates made to a social network site |
| Payment History | Creditworthiness of user |
| Client Device History | Determining if the client device used is one of client devices commonly used by the user |
| Usage Patterns | Keystroke patterns used during a session |

Table 1 is not intended to be an exhaustive list of user indicia. User indicia may come from third parties, such as credit checks. User indicia may be provided via interfaces to other information systems.

In block 318, the profile based authentication service 126 receives the authentication request 124, and proceeds to analyze the authentication request 124. Analysis may comprise identifying a correlation model corresponding to the authentication request 124. The identified correlation model will then specify user historical activity records to retrieve from data store 110. The correlation model will then determine if the user indicia in the authentication request 124 is similar to the retrieved user historical activity records. In some embodiments, a correlation model will identify content patterns, for example comparing the degree of profanity in the user indicia in the authentication request 124 to historical patterns. In other embodiments, a correlation model will identify usage patterns, for example determining if a credit card payment is made immediately after browsing a web site when in contrast the user historically views the same web site at least a dozen times prior to committing to a purchase. In yet other embodiments, the correlation model could track behavioral patterns where the user updates a social network record only during lunch time.

Analysis may work with an arbitrary subset of user historical activity records as stored. Accordingly, the analysis may compares results from different correlation models before making a final determination of correlation.

Regardless of the correlation model used, the correlation model may identify the degree of correlation, for example in the form of a similarity score, and will determine whether the similarity score exceeds a particular threshold. Alternatively, the correlation model may indicate that confidence in a particular determination is insufficient and will make no determination. For example, analysis may determine that the correlation model has insufficient user historical activity records to make a determination.

Thresholds for whether correlation is sufficiently high to warrant authentication may differ based on the information system making the authentication request. Financial transactions and personal information may require high thresholds. Alternatively, general web sites may require relatively low thresholds. Thresholds may vary according to the scope of interaction of the user. For example, a per transaction authentication may have a lower threshold than a per session authentication. Similarly a per session authentication may have a lower threshold than an interaction that spans multiple sessions. Different vertical applications may have different thresholds. For example, a medical information system may have a higher threshold than an entertainment application.

Analysis results may be shared in many different ways. A common scenario may be to send a message indicating either authentication, or an error message indicating either insufficient data or rejecting authentication. Alternatively, the analysis results may be accessed directly through an exposed application programming interface ("API"). By way of yet another example, the analysis results may be aggregated into a single similarity score and exported for use by other applications or scenarios. For example, a contest web site may determine that it is 70% confident that a user is who the user claims to be. Based on the 70% confidence value, it may limit contest prizes to lower values than if it had 100% confidence.

In block 320, if the analysis in block 310 determines that the user authentication request fails, then this is termed an adverse event. Adverse events may be determined either substantively in real time, for example if the information system making an authentication request is an interactive system. Alternatively, adverse events may be determined in batch, for example in collecting disputed charge records which are to be presented to the user in a monthly bill.

Once an adverse event is identified, the adverse event is handled in block 322. Just as adverse events may be determined in real time or alternatively in batch, the adverse event may be handled in real time or alternatively in batch as well.

Real time handling of adverse events may include shutting the user out of the system, or providing a modal dialog box requiring the user to proffer alternative user credentials. For less critical scenarios, adverse events may simply be captured, and notification sent to the user via electronic mail, text messaging, or other forms of asynchronous communications.

In block 324, the profile based authentication service 126 may receive a request to correct a correlation model. Correlation models may be refined, or may be replaced. For example, if the profile based authentication service 126 determines that there is a high degree of false positives where authentication is rejected, but the unknown user is able to proffer correct alternative credentials, the correlation model may be marked as flawed or subject to correction, refinement or replacement in block 326.

Turning to a pattern detection scenario 306, a service 128 may perform data mining on the user profiles, the user identity fingerprints, or both.

In block 328, a service 128 determines the desired data and performs a data query against the user profiles, the user identity fingerprints, or both. The data query may be in the context of some external correlation model. When querying user identity fingerprints, the query may retrieve pre-generated identity fingerprints corresponding to a time period. Alternatively, the query may request new user identity fingerprints to be generated dynamically with the most recent data.

In block 330, the service 128 applies an external correlation model to determine patterns of users corresponding to the retrieved data. The patterns may relate to the users themselves, such as in identifying popular products purchased. In another example, the patterns may relate to the historical user activity such as identifying the most common scenarios that authentication requests failed (e.g. in threat assessment). By way of another example, the external correlation model results may be analyzed to detect errors in the multi-factor identity fingerprinting system, thereby providing a sort of debug facility.

Exemplary Profile Based Authentication Application—Mobile Media

Figure 4:
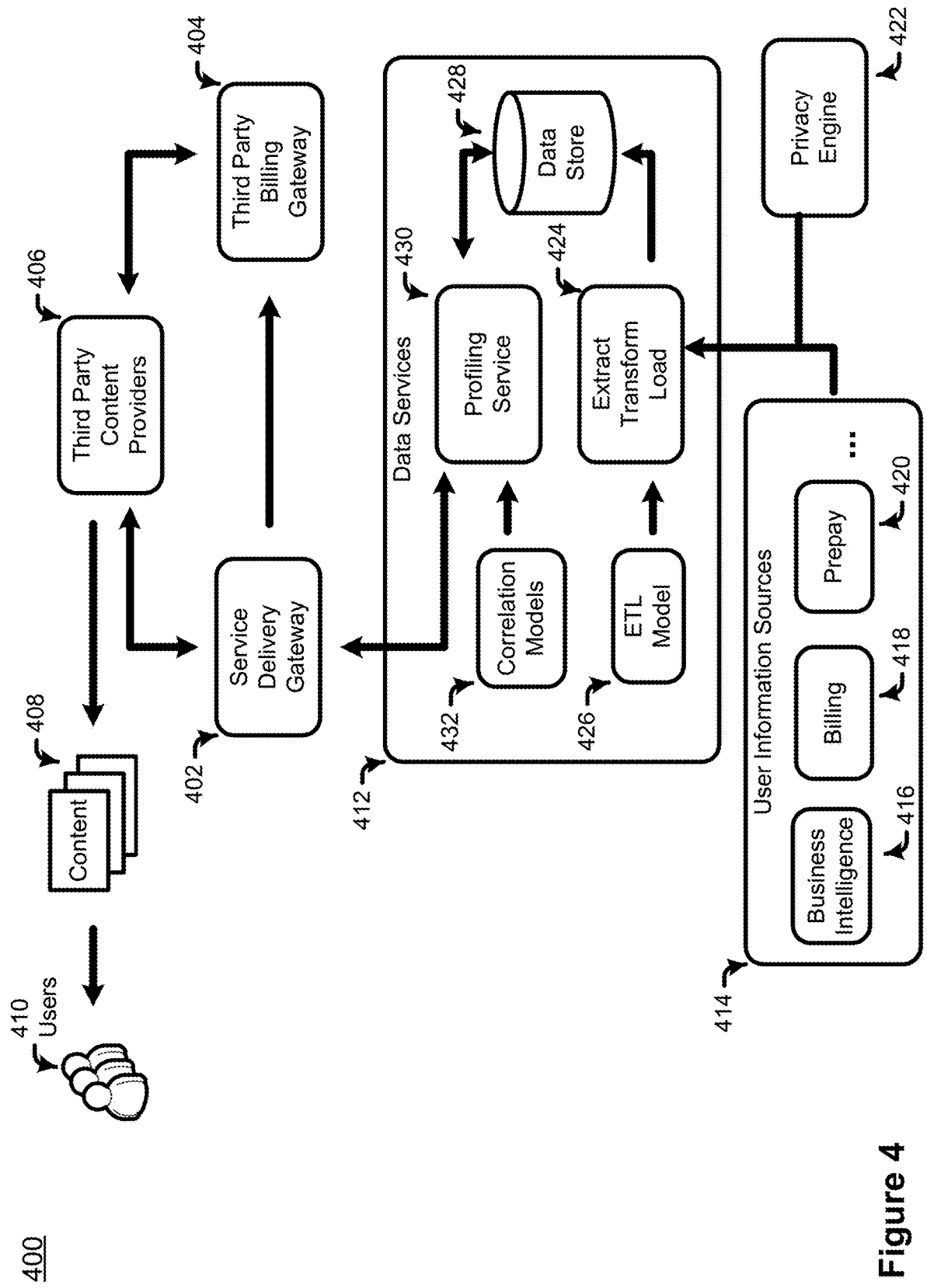
FIG. 4 is a top level diagram illustrating an example application of multi-factor identity fingerprinting in the mobile media vertical.

FIG. 4 illustrates an exemplary application of multi-factor identity fingerprinting 400. Specifically, FIG. 4 illustrates loading existing user profile information and applying multi-factor identity fingerprinting for mobile device multimedia content requests on mobile devices 400 in a Service Delivery Gateway ("SDG") 402 and Third Party Billing Gateway ("3PG") 404 infrastructure.

Consider a Wideband Code Division Multiple Access ("WCDMA") cellular provider. Third party content providers 406 wish to serve paid content 408 to users using mobile devices 410 over the WCDMA provider. One possible configuration for a WCDMA network to support third party data services is to use an SDG 402 to interface with Data Services 412. When content is served by the SDG 402, billing is handled by the 3PG 404.

Since the content is for pay, it may be desirable to implement multi-factor identity fingerprinting to ensure that served content was in fact ordered by a user.

First a critical mass of profile information must be collected for the profiles. Cellular providers already have a wide range of user information sources 414. Sources may include pre-existing business intelligence sources 416 such as credit scores and default rates, billing information 418 for cellular subscriptions, and prepay information 420 for prepay cellular customers. Information from these user information sources 414 may be loaded into the data services layer 412 which is optionally filtered via a privacy engine 422.

The information from the user information sources 414 is loaded via an extract transform and loading routine ("ETL") 424 as informed by a ETL Model 426 and then converted into profiles for storage into data store 428. The ETL Model 426 may be comprised of a data model and several rules and constraints.

Once the profiles are loaded, the SDG 402 may perform authentications via profiling service 430. Specifically, an unknown user 410 makes a content request of a third party content provider 406. The SDG 402 may have a local profiling client or may directly perform authentication by accessing the profiling service 430. The profiling service will access records via data store 428. According to one or more correlation models 432, the profiling service 430 will return a message indicating whether to authenticate, to reject, or whether there is insufficient information to make a determination.

If the unknown user 410 is authenticated, the SDG 402 and the third party content provider 406 will serve the requested content 408 to user 410, and third party content provider 406 will have the 3PG 404 bill the user 410 as authenticated by SDG 402.

Otherwise, the third party content provider 406 will reject the request. Optionally, the third party content provider 406 may generate a report or send a notification to the account owner of the failed authentication.

Exemplary Security Fingerprint Logical Architecture

Figure 5:
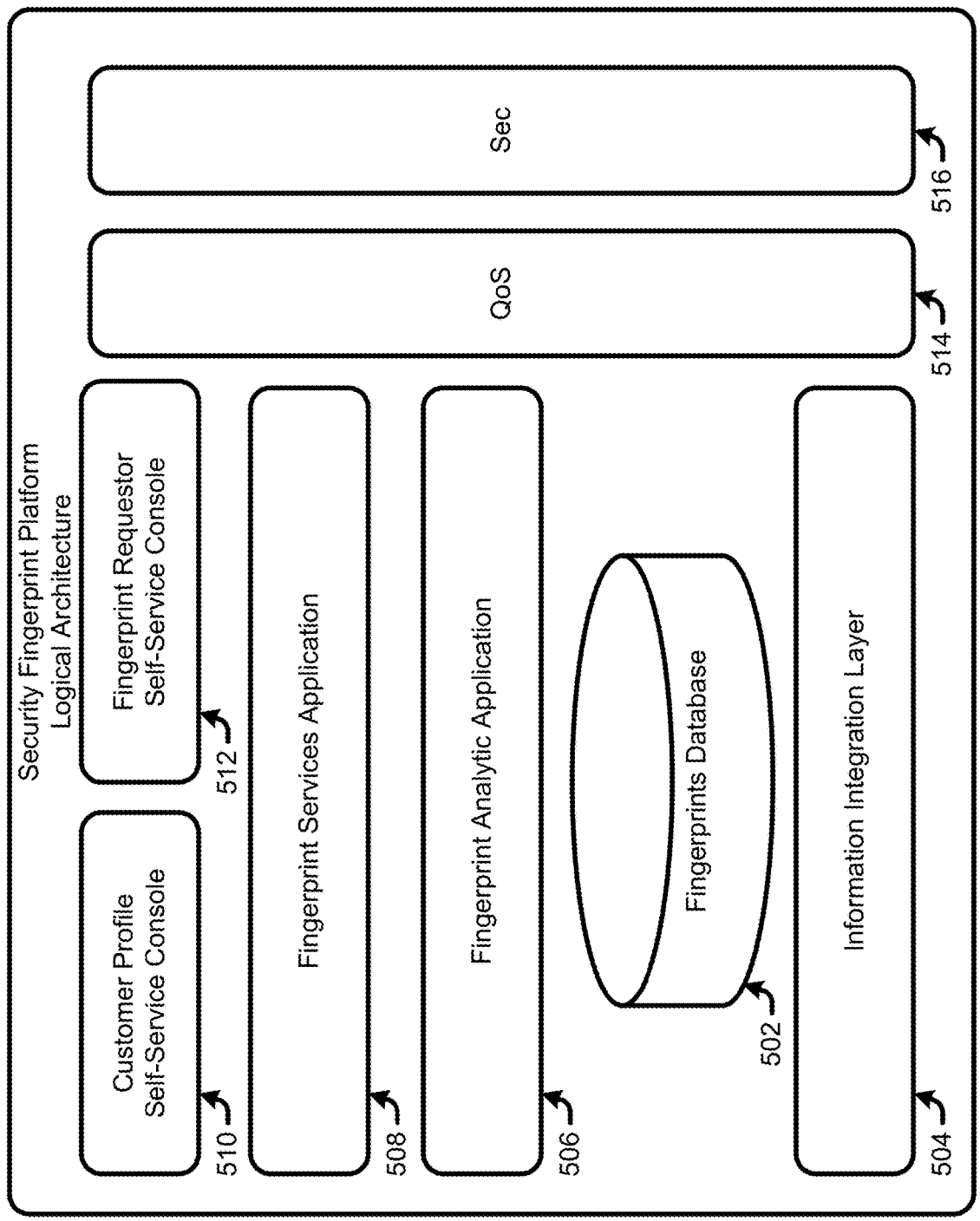
FIG. 5 is a block diagram of an exemplary logical architecture for a security fingerprint platform.

Security fingerprints may be generated for customer users either on the basis of a profile or independent of a profile. They are served to fingerprint requestors based on authentication protocols. FIG. 5 illustrates an exemplary security fingerprint logical architecture 500, to support security fingerprint functions.

The fingerprint database 502 is the main database of the Security Fingerprinting platform. It contains configuration and metadata for Security Fingerprint applications, monitoring data of processes, input data acquired from enterprise customer data sources and the data mining result data. All historical data is kept until a configurable time period ends, for example 10 years. The fingerprint database 502 may be a relational database, or may be a non-SQL or columnar database.

The fingerprint database 502 receives data from enterprise data assets via the information integration layer 504. The information integration layer 504 performs data acquisition, federation and integration tasks. It supports multi-format, multi-protocol, real time, near real time, or batch modes for data integration. In general, the information integration layer 504 performs any tasks to manage the extraction, transformation and loading, and the time of loading of fingerprint relevant data from enterprise data assets.

One of the primary consumers of the fingerprint database 502 is the fingerprint analytical application 506. The fingerprint analytical application 506 is the main application which performs the processing logic and/or rules for fingerprints and the fingerprint generation algorithms. It also contains the controller module for process management and scheduling. Fingerprint logic and/or rules are further discussed with respect to FIGS. 6 and 7.

The fingerprint services application 508 performs the serving of fingerprints based on a request and may also perform the serving of data from fingerprints based on a query. Note that alternatively, that a fingerprint may be queried independent of the fingerprint services application 508. The fingerprint services application 508 is the services layer to expose the security fingerprint data. While there are a set of business services based on the data, there are also multiple customer users and/or requestors facing proxy services created to satisfy business purposes, policy, contract terms and conditions.

As previously mentioned, a fingerprint may be based on a profile, may support different fingerprint modes, and may utilize various security and/or encryption protocols. The customer profile console 510 is the customer facing user interface for managing profile data and/or privacy information use preferences.

Fingerprint requestors maintain accounts to allow them to receive fingerprints according to subscription and security constraints. The fingerprint requestor console 512 is the self-help interface for fingerprint requestors to manage accounts and/or subscriptions, and to order services and request support.

The quality of service ("QoS") components 514 and security component 516 provide services orthogonal to other functionalities in the logical platform. Specifically, the quality of service ("QoS") components 514 provide system administration tools to administer the fingerprint platform and applications to ensure the Security Fingerprint platform performs reliably within the specified Service Level Agreements ("SLAs").

The security component 516 implements the security protocols used for authentication, authorization and other security functions. Specifically, the security component 516 ensures valid access to the fingerprint applications, services and the fingerprints database. It verifies users, fingerprint modes, roles, security credentials, authentication tokens, digital signatures, and the like to comply with information security standards and regulations.

Exemplary Security Fingerprint Platform Architecture

Figure 6:
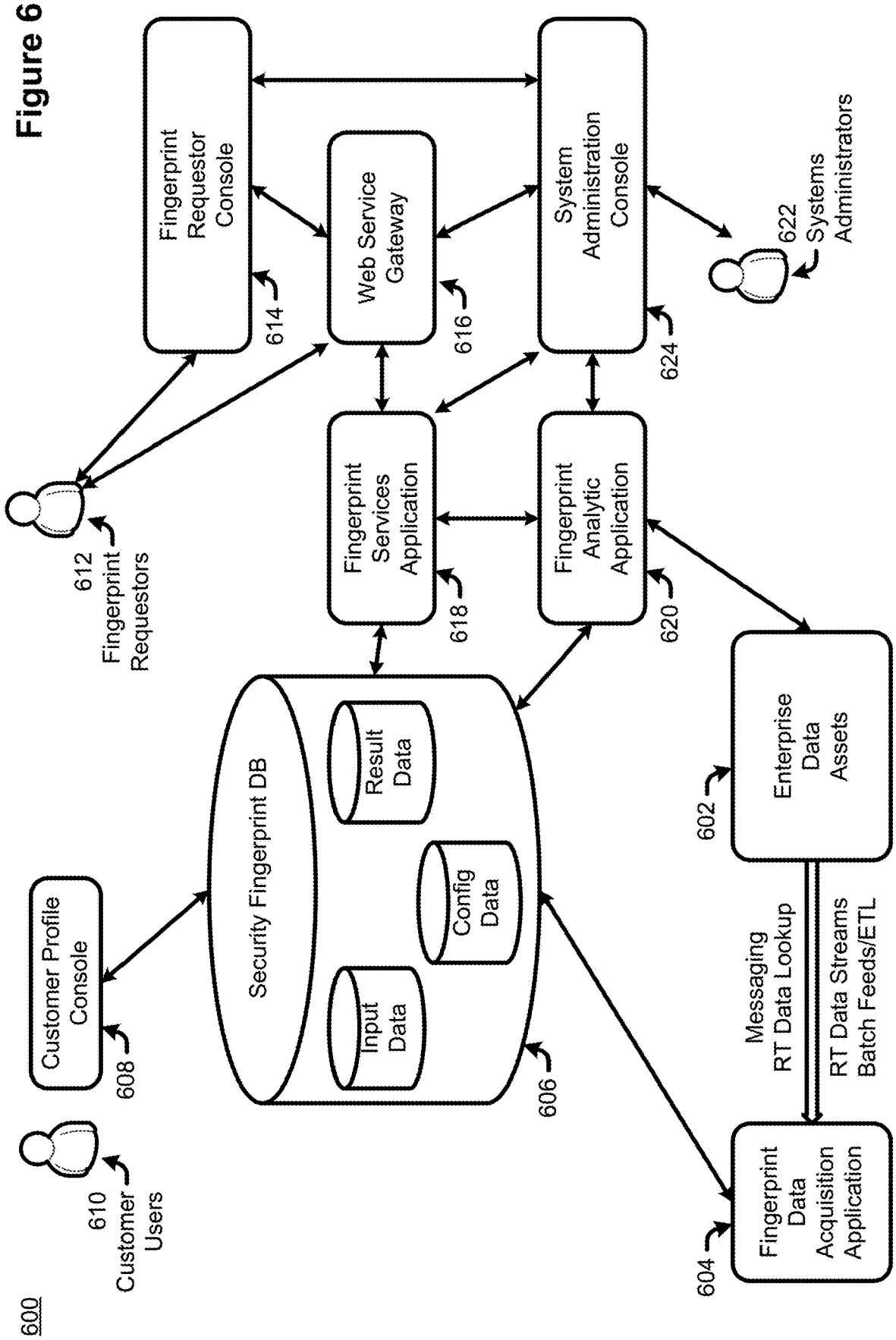
FIG. 6 is a diagram of an exemplary implementation of a logical architecture for a security fingerprint platform from an application and services perspective.

FIG. 6 illustrates one potential implementation 600 of the Security Fingerprint Logical Architecture 500 set forth in FIG. 5.

Data is first collected from a number of enterprise data assets 602. Enterprise data assets 602 include any data that may be collected by an enterprise, or acquired via third parties. For example, enterprise data for a cellular operator might include the following:

Customer account information;
Customer subscription information;
Products and/or devices used by the customer (e.g., cell phones, smart phone applications);
Orders made by the customer;
Customer billing history;
Demographics of the customer;
Network usage by the customer;
Reported customer satisfaction metrics by the customer;
Location and context information of the customer substantially in real time;
Customer interactions via a mobile device and applications on the mobile device;
Business Support System/Operations Support System customer records; and
Results of analytics operations on the customer.

The data collection against the enterprise data assets 602 may be performed by a fingerprint data acquisition application 604. The fingerprint data acquisition application 604 may be implemented by invoking services of the information integration layer 504. The fingerprint data acquisition application 604 may receive data from the enterprise data assets 602 in a number of ways, including receiving periodic messages or real time data streams from various enterprise data assets 602, performing real time data lookups against the enterprise data assets 602, or performing periodic extract/transform/load ("ETL") functions against one or more enterprise data assets 602 potentially as a batch process.

Upon receiving data from enterprise data assets 602, the fingerprint data acquisition application 604 may perform various analytics and/or transformations on the received data. Examples include, performing semantic analysis, executing a rules engine on the received data, queuing the messages in message queues, performing stream post-processing of received data streams, and federating data. Since there is likely to be a disparate number of enterprise data assets 602, the fingerprint data acquisition application 604 may maintain a corresponding number of data adapters to support data in various formats and via various protocols. In this way, the fingerprint data acquisition application 604 has an extensibility model to support an arbitrary data format and/or data protocol.

The fingerprint data acquisition application 604 loads the security fingerprint database 606. The fingerprint database 606 may support various sub databases including input data which are the finalized loaded data from the fingerprint data acquisition application 604, configuration data which are profile and/or preference data from consumer users, and result data which are the results of analytic performed on data in the fingerprint database 606.

Configuration data is entered via the customer profile console 608 as accessed by customer users 610. Customer users 610 enter profile and/or preference data via web or standalone application. Profile and preference data is discussed in more detail with respect to FIG. 7.

The discussion up this point has focused on how data that comprise fingerprints enter an implementation of the security fingerprint platform 600. The discussion will turn to how a fingerprint requestor receives fingerprints from an implementation of the security fingerprint platform 600.

A fingerprint requestor 612 can either request a fingerprint via the fingerprint requestor console 614 or via the web service gateway 616. The fingerprint requestor console 614 is typically used to maintain a fingerprint requestors account and/or subscription, preference setting, service issue management (e.g., help desk) and web service catalog. The fingerprint requestor console 614 may also include utilities to request, receive and query fingerprints. If a fingerprint requestor is an automated process, a fingerprint may also be directly accessed via web service gateway 616, which provides a gateway to the fingerprint platform 600, specifically the fingerprint services application 618. The web service gateway 616 makes use of QoS 514 and security components 516 of the fingerprint logical architecture 500. In particular, the web service gateway 616 may provide services including, authorization, authentication, policy enforcement and routing and mediation.

The fingerprint services application 618 corresponds to the fingerprint services application 508 in FIG. 5, and provides the key interface for serving fingerprints, usually via a set of business services. To track and provide access to the web service gateway 616, the fingerprint services application 618 may support a web service registry and a set of proxy web services.

Business services on fingerprints performed by the fingerprint services application 618, are via primitive operations embodied in the fingerprint analytic application 620. The fingerprint primitive operations provided by the fingerprint analytic application 620 may include operations to transform, analyze, version, maintain and query fingerprints. Fingerprint primitive operations are discussed in more detail with respect to FIGS. 7 and 8.

Up to this point, the discussion has focused on how to serve fingerprints. To maintain and service the fingerprint security platform 600, system administrators 622 access the fingerprint security platform 600 via a system administration console 624. The system administration console 624 has access to all components enumerated in the fingerprint logical architecture 500 of FIG. 5. In particular, it can access the fingerprint requestor console 614, the web service gateway 616, fingerprint services application 618 and fingerprint analytical application 620, as well as fingerprint database 606. Accordingly, the system administration console 624 may track all aspects of a fingerprint from creation through service to utilization of the served fingerprint for analysis.

Profiles and Security Fingerprints

Figure 7:
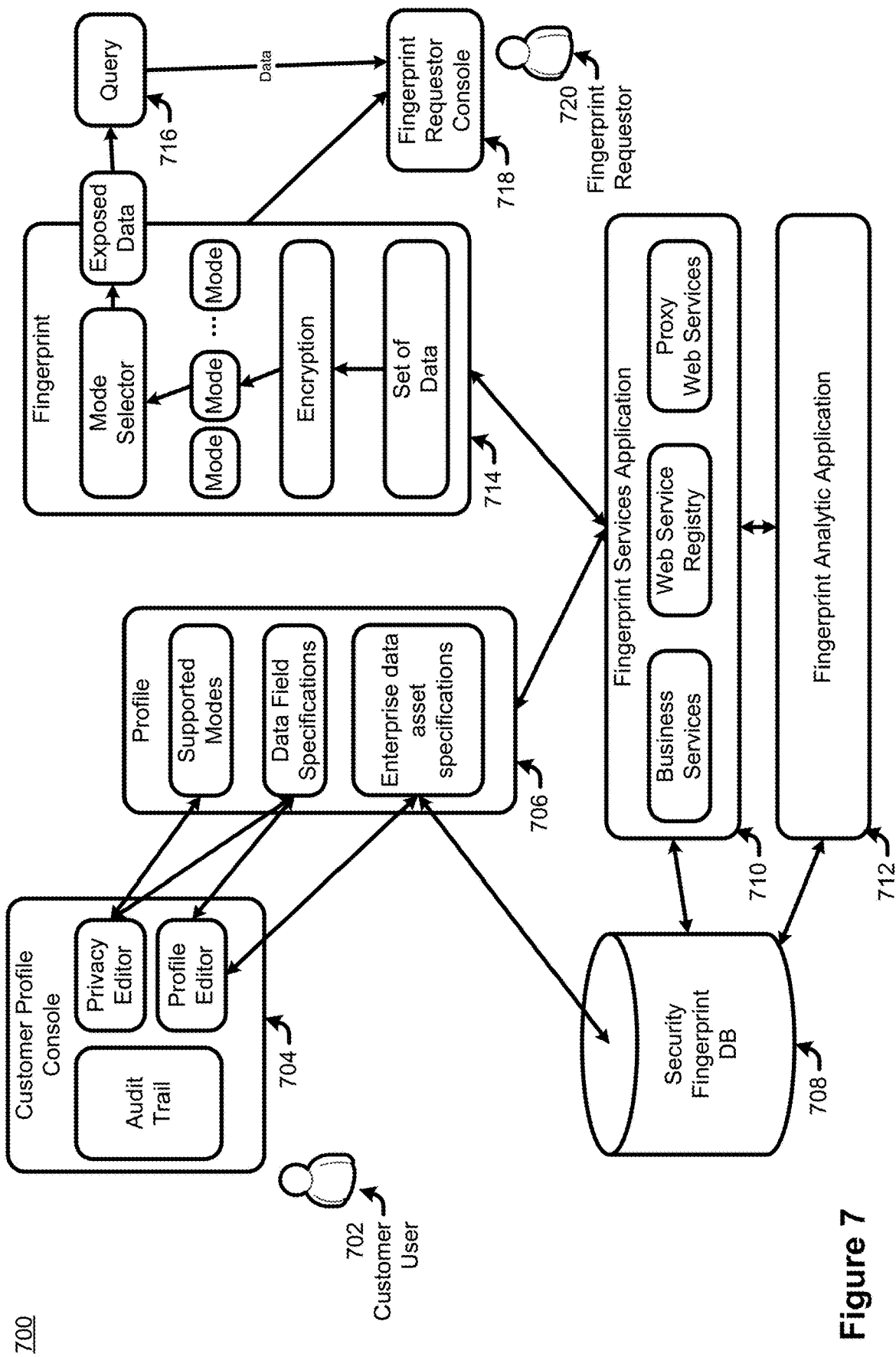
FIG. 7 is a diagram of an exemplary implementation of a logical architecture for a security fingerprint platform from the perspective of a fingerprint.

Up to this point, the discussion has focused on receiving and serving of fingerprints, potentially based on profiles. FIG. 7 illustrates one potential security fingerprint platform implementation 700 of how a profile may be populated, and the internals of a fingerprint.

A customer user 702 accesses the fingerprint platform 700 via a customer profile console 704. The customer profile console 704 may comprise a privacy editor and a profile editor. The privacy editor may be used to set various privacy settings in profile 706 and may be used to create, update and delete modes for the customer user's fingerprint or fingerprints. The profile editor may be used to edit non-privacy data fields, such as customer user identity fields (e.g., name, address, and identification numbers). The profile editor also specifies which enterprise data assets are to be encapsulated in a customer user's fingerprint or fingerprints. In this way, the customer user need not rely on security functions alone to prevent access to data; rather the customer may prevent the data from being included in a fingerprint in the first place. The customer profile console 704 also supports an audit trail function in order to track change histories in profiles. This audit trail may be used, for example, to detect unauthorized profile changes. Changes to profile 706 via the customer profile console 704 are persisted to security fingerprint database 708.

Fingerprints are generated from the security fingerprint database 708 via the fingerprint services application 710. The fingerprint services application generates fingerprints in response to a fingerprint request via its business services components. The business services components may implement functionalities in terms of primitive fingerprint operations encapsulated in the fingerprint analytic application 712. Since fingerprints may be served over the web, the fingerprint services application 710 may maintain a web service registry and a proxy web services component.

A fingerprint 714, once generated, will encapsulate some subset of data corresponding to the customer user 702. The encapsulated data may be encrypted and/or compressed. A fingerprint 714 may support zero, one or many fingerprint modes. A fingerprint mode specifies which portion of the data, which fingerprint requestors and under what circumstances the encapsulated data may be accessed via a query. When a fingerprint 714 receives a query 716, a mode selector of the fingerprint 714 detects the identity of the fingerprint requestor, and the context, and selects a corresponding fingerprint mode. A default fingerprint mode may also be invoked. Accordingly, only a subset of the encapsulated data is exposed to the query 716. The query is then executed on the exposed data, and data returned to a fingerprint requestor console 718 or querying application, and thereby to the fingerprint requestor 720. Note also that a fingerprint requestor may simply retrieve a fingerprint 714 for querying independent of the fingerprint implementation 700.

Exemplary Primitive Fingerprint Operations

Figure 8:
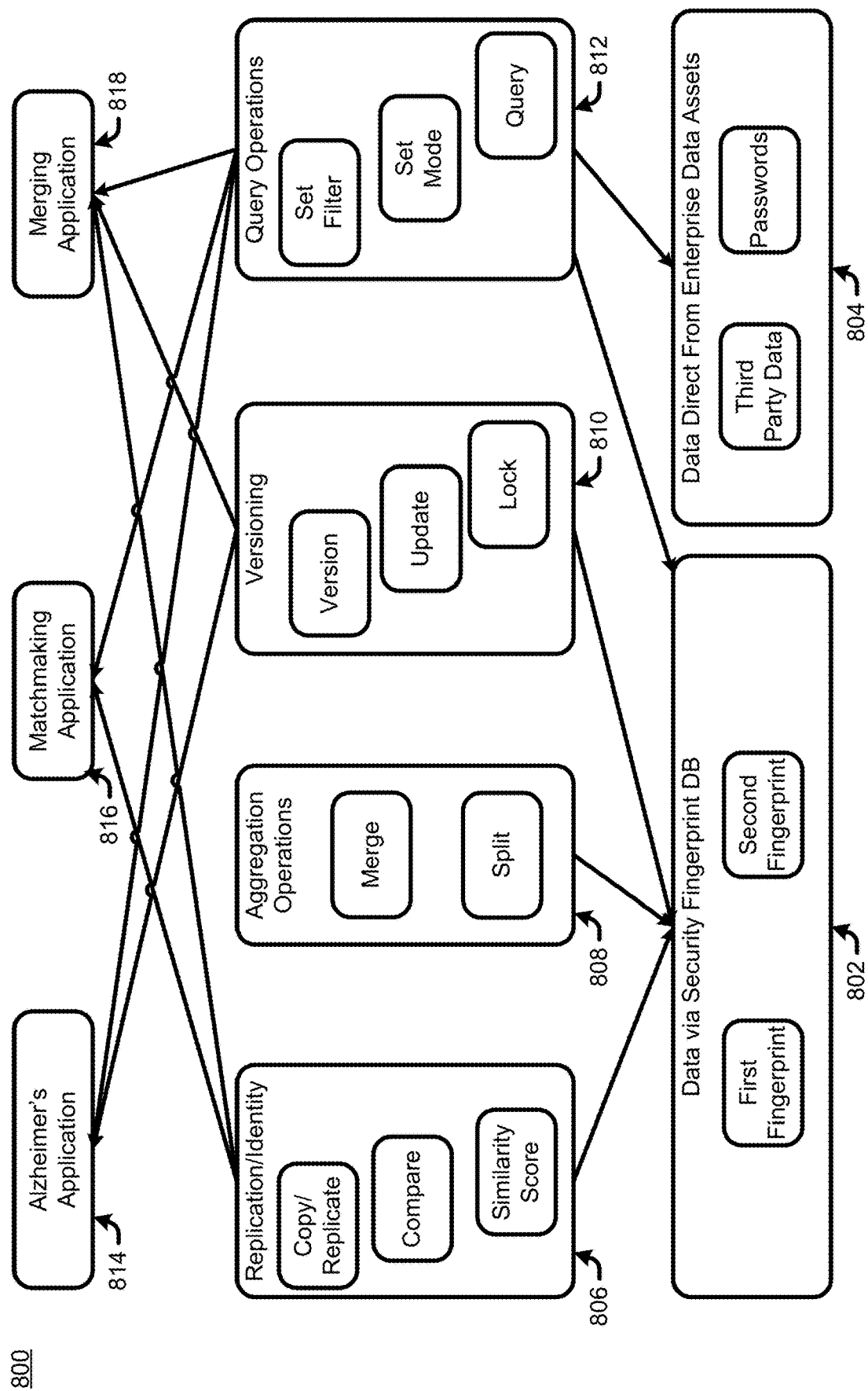
FIG. 8 is a diagram illustrating the relationship between fingerprint services applications, primitive fingerprint operations, and the underlying data from data assets.

Applications on fingerprints, such as those described with respect to fingerprint services application 710 in FIG. 7, are implemented with primitive fingerprint operations. Primitive fingerprint operations, are low level operations on fingerprints to transform and/or query fingerprints. FIG. 8 illustrates the interaction 800 of example fingerprint services applications, primitive fingerprint operations, and the underlying data from the enterprise data assets.

Primitive fingerprint operations may operate on fingerprints, on fingerprint data in the fingerprint database 802, and/or on other data such as data directly accessed from enterprise data assets 804. The direct access of enterprise data assets 804 may be effected via the information integration layer 504 services as described with respect to FIG. 5.

Primitive fingerprint operations may support the following classifications of operations:

Replication and Identity Primitive Operations 806: A fingerprint can be uniquely identified. A fingerprint may be cloned such that its encapsulated data and modes are replicated, except for a unique fingerprint identifier. Copy/replicate primitive operations may perform this replication. A compare function may determine whether two fingerprints are identical except for the unique fingerprint identifier. A similarity score function may determine the degree that two fingerprints are similar. Since the functions do not expose data to a fingerprint requestor, the encapsulated data remains secure, while allowing a fingerprint requestor to perform a comparison.

Aggregation Primitive Operations: Fingerprints may be merged or split. For example, a set of customer users may decide to be treated as one entity, for example four cellular users in the same family may simply wish to have a single fingerprint for the entire family. In this scenario, the four fingerprints corresponding to the four family individuals may be merged into a single fingerprint. Note that the family members may opt to merge replicated copies of their fingerprints, thereby preserving an option to maintain a personal fingerprint. The opposite of merging is splitting. For example, consider a fingerprint that captures data for a husband and wife. The husband and wife may seek to have individual fingerprints if they are receiving product recommendations for each other. Accordingly, a split operation will review the underlying encapsulated data, identify compatible clusters of data, and separate the fingerprints into two fingerprints, with a best guess of which data belongs to which spouse.

Versioning Primitive Operations 810: Fingerprints evolve over time. They receive new underlying data. They may be merged or split. If a fingerprint requestor desires to know that a fingerprint has current data, a version function may be invoked to report a version number and/or a creation date. An out of date fingerprint may be refreshed by invoking an update function. In this way, a large fingerprint need not be regenerated from scratch. Rather a delta of underlying data need only be added. A fingerprint may be locked from update as well. For example, if a fingerprint requestor is only authorized to receive fingerprints for a period of time, a lock would help ensure that over time, the fingerprint's data was less useful due to data staleness.

Query Primitive Operations 812: Fingerprints may be queried. A query primitive operation executes a requery against a fingerprint's encapsulated data subject to the presently set mode and any additional filters. The set mode primitive operation is used by the mode selector to set the mode to be used for a particular query. The set filter primitive operation may be used to add additional query conditions independent of a mode. Additional primitive operations to enumerate modes and filters may be specified as well.

Applications 814, 816 and 818 are exemplary fingerprint services applications. An Alzheimer's application 814 is described with respect to FIG. 9. A matchmaking application 816 is described with respect to FIG. 10. A fingerprint merging application is described with respect to FIG. 11.

Exemplary Security Fingerprint Architecture Use Cases

The security fingerprint architecture supports a wide range of use cases. The following are some exemplary security fingerprint architecture use cases:

Memory Augmentation

Figure 9:
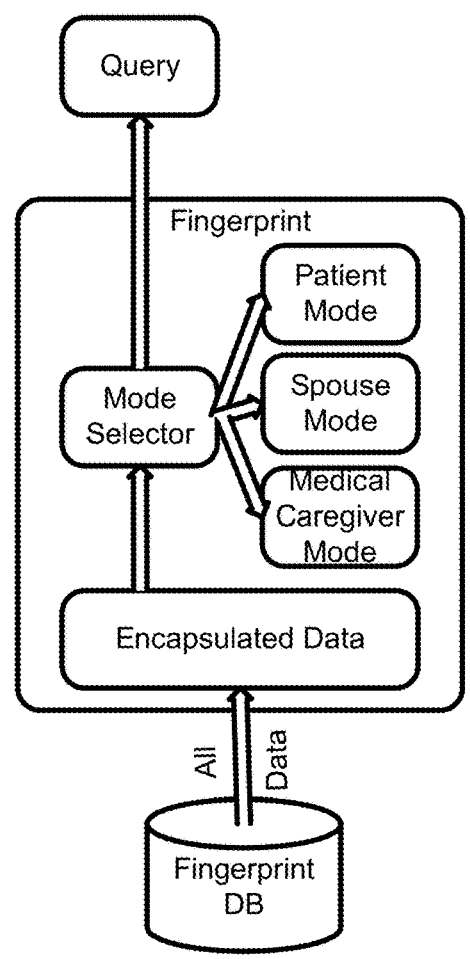
FIG. 9 is a diagram of an implementation of an exemplary application to assist an memory impaired patient based on security fingerprints.

FIG. 9 illustrates an application 900 of fingerprint services for tracking user behaviors. One example application is tracking user behaviors for future retrieval with a long term memory loss or memory impaired patient. By way of example, consider a patient, such as an Alzheimer's patient who cannot remember much of their past. Such a patient might record events of their life as it happens. Much of this data is personal, and should be restricted with privacy settings. But the patient may not be capable of maintaining such settings. Accordingly, a security fingerprint may provide a solution.

A security fingerprint is generated from the fingerprint database. Specifically, the fingerprint encapsulates data from a query on the fingerprint database. Note that the amount of data may be large, and it may be overly time consuming to regenerate the fingerprint. Accordingly, the memory augmentation application may invoke the version function of the versioning primitive operations 810 to find out the time of the last update and then perform an update function also of the versioning primitive operations 810. In this way, the delta between the last update need only be queried.

When a query is made, it is via the query function of the query primitive operations 812. The mode selector determines the identity of the querying fingerprint requestor and selects a mode. If the querying fingerprint requestor is the patient him or herself, all encapsulated data is made available via the set mode function of the querying operations 812. If the querying fingerprint requestor is a spouse, then a smaller subset of the encapsulated data based on the spouse's interest may made available by setting the fingerprint mode to a mode specific to the spouse. If the querying fingerprint requestor is a caregiver, then a mode specific to providing medical data may be set via the set mode function as well.

Matchmaking Application

Figure 10:
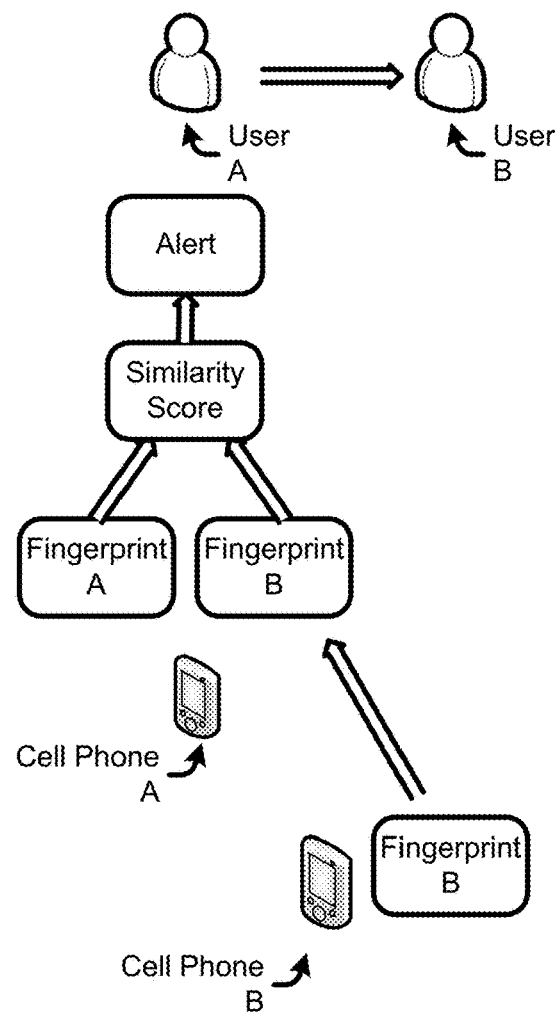
FIG. 10 is a diagram of an implementation of an exemplary matchmaking application based on security fingerprints.

FIG. 10 illustrates a matchmaking application using security fingerprints. Matchmaking is the introduction of two or more people who are compatible. Contexts of compatibility may include determining whether two individuals are complementary enough for a potential date, professional conferences where individuals with similar professional interests are matched, or service providers whose skills are matched to customer's needs. Consider a scenario where two customer users are proximate to each other but are unknown to each other. A matchmaking application may automatically detect whether the two customer users are compatible with each other to the degree that they may want to introduce each other.

Fingerprint A is resident on cell phone A of customer user A. Fingerprint B is resident on cell phone B of customer user B. Cell phone A may have an application that automatically checks for compatible proximate customer users. Specifically, when cell phone A is proximate to cell phone B, it can query customer user B's fingerprint. Upon receiving the customer user B's fingerprint, cell phone A may run a similarity score function from the replication/identity primitive operations 806. If the similarity score function exceeds a predetermined threshold, the application may query customer user B's fingerprint for data in common with customer user A via a query operation using query primitive operations 812. The application may then make an alert populated with the data returned from the query. Since the similarity score is against an amount of data larger than what customer user B would have made public, the comparison is more likely to be more accurate. Furthermore, the alert can be customized to specify what features customer user A and customer user B have most in common.

Group and Individual Identity from the Same Security Fingerprint

Figure 11:
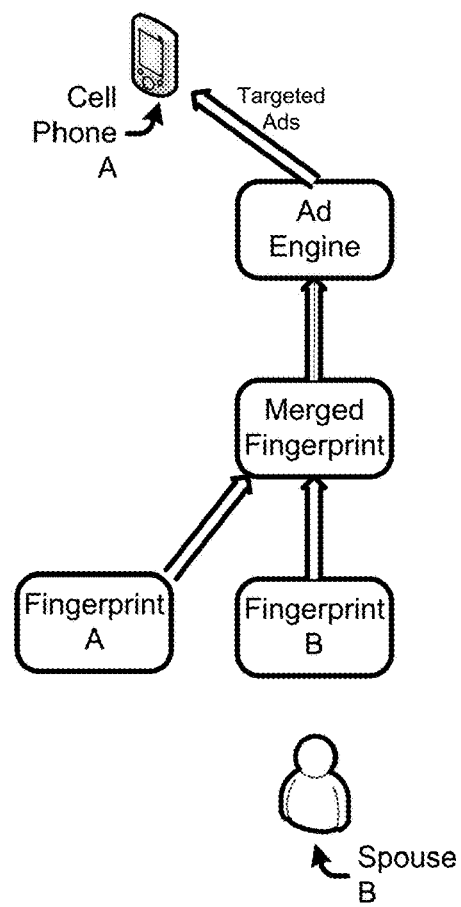
FIG. 11 is a diagram of an implementation of an exemplary application based on merging security fingerprints.

A security fingerprint can represent an individual or a set of individuals. FIG. 11 illustrates a scenario where two spouses seek to merge their fingerprints together. Consider a scenario where a husband seeks to identify vacation spots for himself and his spouse. However, his personal fingerprint A only reflects his personal preferences. First the husband copies his personal fingerprint using the copy/replication primitive operations 806. Then the user retrieves his spouse's fingerprint B and merges it with the copy of his fingerprint A using the merge function of aggregation primitive operations 808. The husband then uses the merged fingerprint to retrieve alerts from an advertising engine specific to vacation spots. In this way, the advertising server is able to surface a set of vacations that the husband is more likely to purchase—even though the vacations may be less compatible with this personal profile. Thus unlike conventional surfacing applications based on profiles, the fingerprint services application is able to account for the desires of other customer users that impact the buying decision.

Security Fingerprint Authentication Augmented by Third Party Sources

Authentication is the verification that a user matches a claimed identity. In the case of profile based authentication, as described above, verification occurs when a user's behavior matches a security fingerprint to a predetermined confidence threshold.

However, authentication need not be performed solely by consulting a security fingerprint. There is a class of third party data sources that may supplement a security fingerprint, but need not be stored in a security fingerprint. For example, a user's social network site, such as a Facebook™ site may contain information about a user that is too bulky or redundant to a security fingerprint. By way of another example, where a user's driving record is accessible via a secure web service, a security fingerprint need not store this information. However, third party data sources may supplement an authentication process. Specifically, where a system compares a user's behavior to a security fingerprint, the calculation of a confidence score may include the following steps: (1) determine the factors used by the confidence score, (2) query the security fingerprint for factors available from the security fingerprint, (3) identify third party data sources corresponding to the remaining factors, (4) query the third party data sources for those remaining factors, (5) report an error if not all factors from third party data sources are not available, and (6) calculate and return a confidence score if all factors from third party data sources are available.

Some confidence scores may conditionally use third party data sources. For example, if a first confidence score is calculated from a security fingerprint, a second confidence score that makes use of third party data sources may be calculated, only if the first confidence score fails to meet a predetermined threshold. In this way, third party data sources may be used to provide an alternative authentication method. By way of another example, a first confidence score may specify that some subset out of a set of specified factors be available in order to calculate the confidence score. In this way, authentication may proceed if one or more third party data sources are unavailable.

Third party data sources may also be used as input for a profile for a security fingerprint. For example, a user context may be determined, for example location from a user's cell phone geolocation facility and date time reading from the cell phone clock. Thus a user's geolocation at a particular data time stamp may be stored in a profile, as well as used a present context to be compared to a security fingerprint. User input may be from other input devices, connected via Bluetooth™ or other connectivity methods. For example, a pacemaker or other medical device reading may be interfaced to a computing device and the data used for storage in a profile for a security fingerprint.

One example of how third party data sources give rise to a business specific use case is the collection of medical data. By virtue of the security fingerprint, an insurance company may verify that a claimant was in fact at the scene of an accident that purported to have caused an injury. By way of another example, an insurance company or a treating doctor may verify that a person is in fact compliant with a therapy or specified medical course of action, such as not smoking, taking insulin, and dietary modifications as part of a diabetes treatment plan.

Aggregation Conditioned on Context

As described above, security fingerprints may be aggregated according to a target profile, the target profile being a set of range values for behavioral factors of interest as tracked by profiles. In this way, individuals may be grouped together and targeted, for example for advertising. However, aggregation may be triggered on a condition. Specifically, the following may be performed: (1) receive a target profile, (2) specify a condition when aggregation is to be performed, (3) upon receiving notification that the condition has been satisfied (a) query a security profile data store for security fingerprint satisfying the target profile, and (b) aggregate the retrieved security fingerprint into a single security fingerprint.

One application of conditional aggregation may be targeted users who are attending a soccer game at a stadium. The target profile may be for home team soccer fans, but only fans who are present at the stadium are aggregated. In this way, the aggregated security fingerprint may be targeted for advertisements of soccer merchandise only available to those physically at the stadium, for example in the stadium vendor booths. Another application may be the conditional aggregation of the security fingerprints of a family. A target profile may be for a husband and wife and their children. When members of a family are proximate to each other, perhaps as determined by geolocation information from their cell phones, the respective security fingerprints of those proximate family members are aggregated. When those family members are no longer proximate, the security fingerprint is disaggregated. In this way, the aggregated security fingerprint may be targeted for advertising or recommendations for family members who are proximate to each other, such as restaurant recommendations targeting only the interests of the family members who are together at that point in time.

Confidence Based Matching During Aggregation and Disaggregation

Security fingerprints may be easily aggregated, since aggregation is simply the combination of stored factors, perhaps with the removal of redundant data. Security fingerprints may also be easily disaggregated, provided that some indicator, such as a flag, is associated with a factor indicating the original security fingerprint it was associated with.

However, sometimes a security fingerprint needs to be disaggregated without any indicia of its constituent security fingerprints. For example, consider a husband and wife who have a single security fingerprint for the both of them. However, the two get divorced, and desire their own respective security fingerprint. If the single security fingerprint was originally generated for both husband and wife, then there is no original husband security fingerprint and no original wife security fingerprint. Accordingly, two security fingerprints will have to be generated by heuristics identifying one or the other.

Aggregation of a security fingerprint may also be based on a heuristic. For example, an individual person may first have a pay as you go cellular plan. Later that individual becomes a cellular subscriber. There may be a first security fingerprint as a pay as you go customer and a second security fingerprint as a subscriber. The cellular company may wish to extract a single fingerprint based on the two original fingerprints. However, the decision to combine the fingerprints is based on a heuristic.

Aggregation and disaggregation heuristics are associated with confidence levels of accuracy. Accordingly, use of a security fingerprint may be conditioned on the confidence level of the heuristic. Specifically, (1) a security fingerprint is generated by a heuristic, (2) a confidence level corresponding to the heuristic is associated with the generated security fingerprint, (3) a query is made against the generated security fingerprint, the query associated with a confidence level, and (4) if the query confidence level is satisfied by the security fingerprint, the queried data is retrieved, but if the query confidence level is not satisfied by the security fingerprint, and error is reported. In this way, false confidence in security fingerprints generated by heuristics may be guarded against. For example, a security fingerprint generated by a low confidence heuristic might be used for advertising, but not for authentication.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to generate an identity fingerprint, comprising:

retrieving at least one record from a data store of records based at least on a profile corresponding to one or more users, the profile comprising a specification of records from the data store and the records relating to historical activities of the one or more users;

converting the at least one record into a set of data; and generating an identity fingerprint from the set of data, the identity fingerprint comprising a plurality of selectable modes with each mode being associated with a different set of access restrictions for exposing at least a part of the set of data for querying, wherein the plurality of selectable modes includes at least a first mode associated with a patient, a second mode associated with a family member, and a third mode associated with a medical caregiver.

2. The method of claim 1, wherein the profile further comprises a specification of access restrictions associated with the set of data, the access restrictions exposing at least a part of the set of data for querying.

3. The method of claim 1, wherein the profile enumerates at least one data field, the at least one data field comprising a data field identifier and an indicator of whether the user has enabled the at least one data field to be exposed by a query applied to the identity fingerprint.

4. The method of claim 1, wherein the profile specifies at least one of the plurality of selectable modes.

5. The method of claim 1, wherein the profile specifies what data source is to be used in maintaining the data store.

6. The method of claim 5, wherein at least one data source comprises a data source identifier and an indicator whether the one or more users have enabled the at least one data source to be used in maintaining the data store.

7. The method of claim 1, wherein the generating the identity fingerprint comprises compressing the set of data.

8. The method of claim 1, wherein the generating the identity fingerprint comprises encrypting the set of data.

9. The method of claim 1, wherein the identity fingerprint includes at least a summary of the historical activities of the one or more users.

10. The method of claim 1, wherein at least one of the second mode associated with the family member or the third mode associated with the medical caregiver allow access to a subset of the set of data.

11. A system to generate an identity fingerprint, comprising:
    a processor;
    a memory;
    instructions stored in the memory configured to cause the processor to perform operations comprising:
        retrieving at least one record from a data store of records based at least on a profile corresponding to one or more users, the profile comprising a specification of records from the data store and the records relating to historical activities of the one or more users, wherein at least one data source used in maintaining the data store comprises a data source identifier and an indicator whether the one or more users have enabled the at least one data source to be used in maintaining the data store; and
        converting the at least one record into a set of data; and
        generating an identity fingerprint from the set of data, wherein the profile enumerates at least one data field, the at least one data field comprising a data field identifier and an indicator of whether the one or more users have enabled the at least one data field to be exposed by a query applied to the identity fingerprint.

12. The system of claim 11, wherein the profile further comprises a specification of access restrictions associated with the set of data, the access restrictions exposing at least a part of the set of data for querying.

13. The system of claim 11, wherein the identity fingerprint comprises a plurality of selectable modes, each mode associated with a different set of access restrictions for exposing at least a part of the set of data for querying.

14. The system of claim 13, wherein the profile specifies at least one of the plurality of selectable modes.

15. A non-transitory computer-readable medium having stored thereon computer-executable instructions configured to program a computing device to perform operations comprising:
    retrieving at least one record from a data store of records based at least on a profile corresponding to one or more users, the profile comprising a specification of records from the data store and the records relating to historical activities of the one or more users, wherein at least one data source used in maintaining the data store comprises a data source identifier and an indicator whether the one or more users have enabled the at least one data source to be used in maintaining the data store; and
    converting the at least one record into a set of data; and
    generating an identity fingerprint from the set of data, wherein the identity fingerprint comprises a plurality of selectable modes, each mode associated with a different set of access restrictions for exposing at least a part of the set of data for querying.

16. The non-transitory computer-readable medium of claim 15, wherein the profile specifies what data source of the at least one data source is to be used in maintaining the data store.

17. The non-transitory computer-readable medium of claim 16, wherein the at least one data source to be used in maintaining the data store is any one or more of:
    cellular activity data; and
    cellular plan data.

18. The non-transitory computer-readable medium of claim 15, wherein the generating the identity fingerprint comprises compressing the set of data.

* * * * *